US009098143B2

(12) United States Patent
Jensen

(10) Patent No.: US 9,098,143 B2
(45) Date of Patent: Aug. 4, 2015

(54) OPTICAL TOUCH-SENSITIVE DEVICE AND METHOD OF DETECTION OF TOUCH

(75) Inventor: Jørgen Korsgaard Jensen, London (GB)

(73) Assignee: O-Net Wavetouch Limited, Hong Kong (CN)

( * ) Notice: Subject to any disclaimer, the term of this patent is extended or adjusted under 35 U.S.C. 154(b) by 406 days.

(21) Appl. No.: 13/577,378

(22) PCT Filed: Feb. 8, 2011

(86) PCT No.: PCT/EP2011/051812
§ 371 (c)(1),
(2), (4) Date: Apr. 24, 2013

(87) PCT Pub. No.: WO2011/095638
PCT Pub. Date: Aug. 11, 2011

(65) Prior Publication Data
US 2013/0215084 A1      Aug. 22, 2013

(30) Foreign Application Priority Data

Feb. 8, 2010   (DK) .................................. 2010 00109

(51) Int. Cl.
G06F 3/042       (2006.01)
(52) U.S. Cl.
CPC .............. *G06F 3/042* (2013.01); *G06F 3/0428* (2013.01); *G06F 2203/04109* (2013.01)
(58) Field of Classification Search
CPC .................. G06F 3/042; G06F 3/0428; G06F 2203/04109

USPC ........ 345/156–184; 385/16, 20, 33, 129, 146; 398/20
See application file for complete search history.

(56) References Cited

U.S. PATENT DOCUMENTS

| 5,157,461 | A | * | 10/1992 | Page ............................. 356/462 |
| 7,352,940 | B2 | * | 4/2008 | Charters et al. ............... 385/129 |
| 7,705,835 | B2 | * | 4/2010 | Eikman .......................... 345/176 |
| 8,064,744 | B2 | * | 11/2011 | Atkins et al. ..................... 385/33 |
| 8,116,624 | B1 | * | 2/2012 | Wach .............................. 398/20 |
| 2002/0034352 | A1 | * | 3/2002 | Williams et al. ................ 385/16 |
| 2003/0103761 | A1 | * | 6/2003 | Lam et al. ...................... 385/146 |
| 2004/0017355 | A1 | * | 1/2004 | Shim ............................. 345/157 |
| 2004/0032401 | A1 | * | 2/2004 | Nakazawa et al. ............ 345/173 |

(Continued)

FOREIGN PATENT DOCUMENTS

| WO | 2009/086836 A1 | 7/2009 |
| WO | 2010048679 | 5/2010 |

*Primary Examiner* — Prabodh M Dharia
(74) *Attorney, Agent, or Firm* — Hamilton, Brook, Smith & Reynolds, P.C.

(57) ABSTRACT

Methods and devices for detecting touch, e.g. by a finger touching a touch-sensitive surface of the device, are disclosed. In particular, detection of touch can be by influencing, by touch, propagation of light within the touch-sensitive device and detecting a resulting change of light arriving to at least one detector device of the touch-sensitive device. Three paths for light can intersect (or at least substantially intersect) at a primary zone of intersection. Thus, three coordinates for a touch at the touch-surface may be provided, and a redundancy of coordinates may be provided for a touch.

21 Claims, 31 Drawing Sheets

(56) References Cited

U.S. PATENT DOCUMENTS

| | | |
|---|---|---|
| 2004/0252091 A1 | 12/2004 | Ma et al. |
| 2006/0088244 A1* | 4/2006 | Kukulj et al. ............. 385/33 |
| 2006/0188198 A1* | 8/2006 | Charters et al. ........... 385/39 |
| 2008/0111796 A1* | 5/2008 | Atkins et al. ............. 345/175 |
| 2008/0179507 A2* | 7/2008 | Han ........................... 250/224 |
| 2008/0266266 A1 | 10/2008 | Kent et al. |
| 2008/0278460 A1* | 11/2008 | Arnett et al. ............. 345/175 |
| 2012/0098794 A1* | 4/2012 | Kleinert et al. ........... 345/175 |

* cited by examiner

Fig. 32 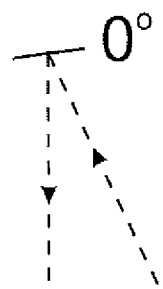 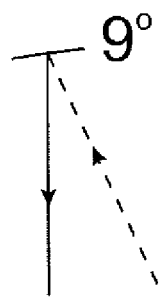 Fig. 33
Fig. 34 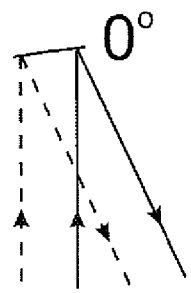 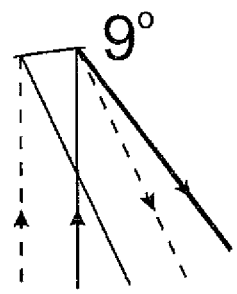 Fig. 35

OPTICAL TOUCH-SENSITIVE DEVICE AND METHOD OF DETECTION OF TOUCH

CROSS-REFERENCE TO RELATED APPLICATIONS

This is the national stage of International Application No. PCT/EP2011/051812, filed on Feb. 8, 2011, which claims the benefit of Danish Patent Application No. PA 2010 00109, filed on Feb. 8, 2010, the contents of all of which are hereby incorporated herein by reference.

STATEMENT REGARDING FEDERALLY SPONSORED RESEARCH OR DEVELOPMENT

Not Applicable

NAMES OF PARTIES TO JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

The present invention relates to a method and a device for detecting touch, e.g. by a finger touching a touch-surface of the device. In particular the invention relates to detection of touch by means of influencing, by means of the touch, propagation of light within the touch-sensitive device and detecting resulting change of light arriving to at least one detector device of the touch-sensitive device.

(2) Description of Related Art Including Information Disclosed Under 37 CFR 1.97 and 1.98

WO 2009/086836 discloses a device for detecting position of an object touching the device. The position of the object touching the device is detected by means of the object disturbing light guided by the device from a light source towards a detector and detecting the resulting change of light arriving to the detector. A position of touch may be determined on the basis of determination of two coordinates of a two-dimensional surface of touch. Thus, in order to determine a position of touch it is of importance that the object may disturb or influence light propagation relating to both coordinates sufficiently.

US 2004/252091 A1 discloses a touch panel in which two or more light sensors emit light into a transparent panel at an angle to sustain transmission through the panel by total internal reflection. The transmitted light is detected at an array of light detection positions around the periphery of the panel opposite to each light source.

US 2008/266266 A1 discloses surface acoustic wave touchscreens and infrared touchscreens that are installed over a display screen. The display screen may be a liquid crystal display, cathode ray tube, Plasma, organic light-emitting diode display, photographic image and the like. For an infrared touchscreen light emitting diodes or other transmitters are located proximate to outer edges of a touch area. The transmitters transmit infrared wave energy that is received by receivers. The receivers may be phototransistors. The receivers are located proximate to a horizontal/vertical side of the touch area opposite the transmitters. If based on infrared technology it may be desirable to provide a substrate for protecting the surface of the display screen.

BRIEF SUMMARY OF THE INVENTION

Accordingly, there is a need for an improved detection of position of an object. Furthermore, there is a need for reduction of the number of detectors in optical touch screens for reducing the production cost.

Thus, it is an object of the present invention to provide an improved detection of position of an object. Furthermore, it is an object of the present invention to provide a device having a reduced production cost.

According to a first aspect of the present invention, a touch-sensitive device is provided. The touch-sensitive device comprises a waveguide that preferably is a planar waveguide, at least one redirecting structure, at least one light source that preferably is adapted to emit light into the planar waveguide, and at least one detector device preferably adapted to detect light from the at least one light source. The planar waveguide comprises a first waveguide layer, a touch-surface being arranged at the first waveguide layer, and at least one edge comprising a first edge. The at least one redirecting structure comprises a first redirecting structure arranged at the first edge. The at least one light source comprises a first light source. The at least one detector device comprises a first detector device adapted to detect light from the first light source. The first light source is adapted to generate first light. The touch-sensitive device is adapted to guide first light towards the first redirecting structure. The planar waveguide is adapted for guiding first light along a first primary path towards the first detector device. The first primary path comprises at least one active part and at least one passive part. The at least one active part of the first primary path comprises a first active part being within the first waveguide layer. The touch-sensitive device is adapted to generate second light. The planar waveguide is adapted for guiding second light along a second primary path towards the at least one detector device. The second primary path comprises at least one active part and at least one passive part. The at least one active part of the second primary path comprises a first active part being within the first waveguide layer. The first active part of the second primary path intersects (or at least substantially intersects) the first active part of the first primary path at a primary zone of intersection. The touch-sensitive device is adapted to generate third light. The planar waveguide is adapted for guiding third light along a third primary path towards the at least one detector device. The third primary path comprises at least one active part and at least one passive part. The at least one active part of the third primary path comprises a first active part being within the first waveguide layer. The first active part of the third primary path intersects (or at least substantially intersects) the first active part of the first primary path and the first active part of the second primary path at the primary zone of intersection. The primary zone of intersection may substantially comprise at least a part of the touch-surface.

Thus, having three paths for light intersecting (or at least substantially intersecting) at the primary zone of intersection as disclosed may provide three coordinates for a touch at the touch-surface. Thus a redundancy of coordinates may be provided for a touch. This redundancy of information may provide an improved detection of position of a touch by an object, e.g. a finger, touching the touch-surface of the touch-sensitive device according to the present invention. Furthermore, the detection of a touch may be more robust to disturbances due the redundancy of coordinates. Determination of only two out of three coordinates may be sufficient for a determination of a position of touch.

According to a second aspect of the present invention, a method for detecting at least one position of touch at a touch-surface on a touch-sensitive device according to the present invention is provided.

The method comprises generating first light by means of the first light source and emitting light from the at least one light source into the planar waveguide. The method further comprises generating second light and generating third light. The method further comprises guiding first light towards the first redirecting structure. The method further comprises guiding, by means of the planar waveguide, first light along a first primary path towards the first detector device, wherein the first primary path comprising at least one active part and at least one passive part, the at least one active part of the first primary path comprising a first active part being within the first waveguide layer of the planar waveguide. The method further comprises guiding, by means of the planar waveguide, second light along a second primary path towards the at least one detector device, wherein the second primary path comprising at least one active part and at least one passive part, the at least one active part of the second primary path comprising a first active part being within the first waveguide layer. The first active part of the second primary path intersects the first active part of the first primary path at a primary zone of intersection. The method further comprises guiding, by means of the planar waveguide, third light along a third primary path towards the at least one detector device, wherein the third primary path comprising at least one active part and at least one passive part, the at least one active part of the third primary path comprising a first active part being within the first waveguide layer. The first active part of the third primary path intersects the first active part of the first primary path and the first active part of the second primary path at the primary zone of intersection. The method further comprises detecting, by means of the at least one detector device, light intensities from the at least one light source.

Thus, having three paths for light intersecting at the primary zone of intersection as disclosed may provide three coordinates for a touch at the touch-surface. Thus a redundancy of coordinates may be provided for a touch. This redundancy of information may provide an improved detection of position of a touch by an object, e.g. a finger, touching the touch-surface of the touch-sensitive device according to the present invention. Furthermore, the detection of a touch may be more robust to disturbances due the redundancy of coordinates. Thus, an improved method for detecting at least one position of touch is provided.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

Figure 1:
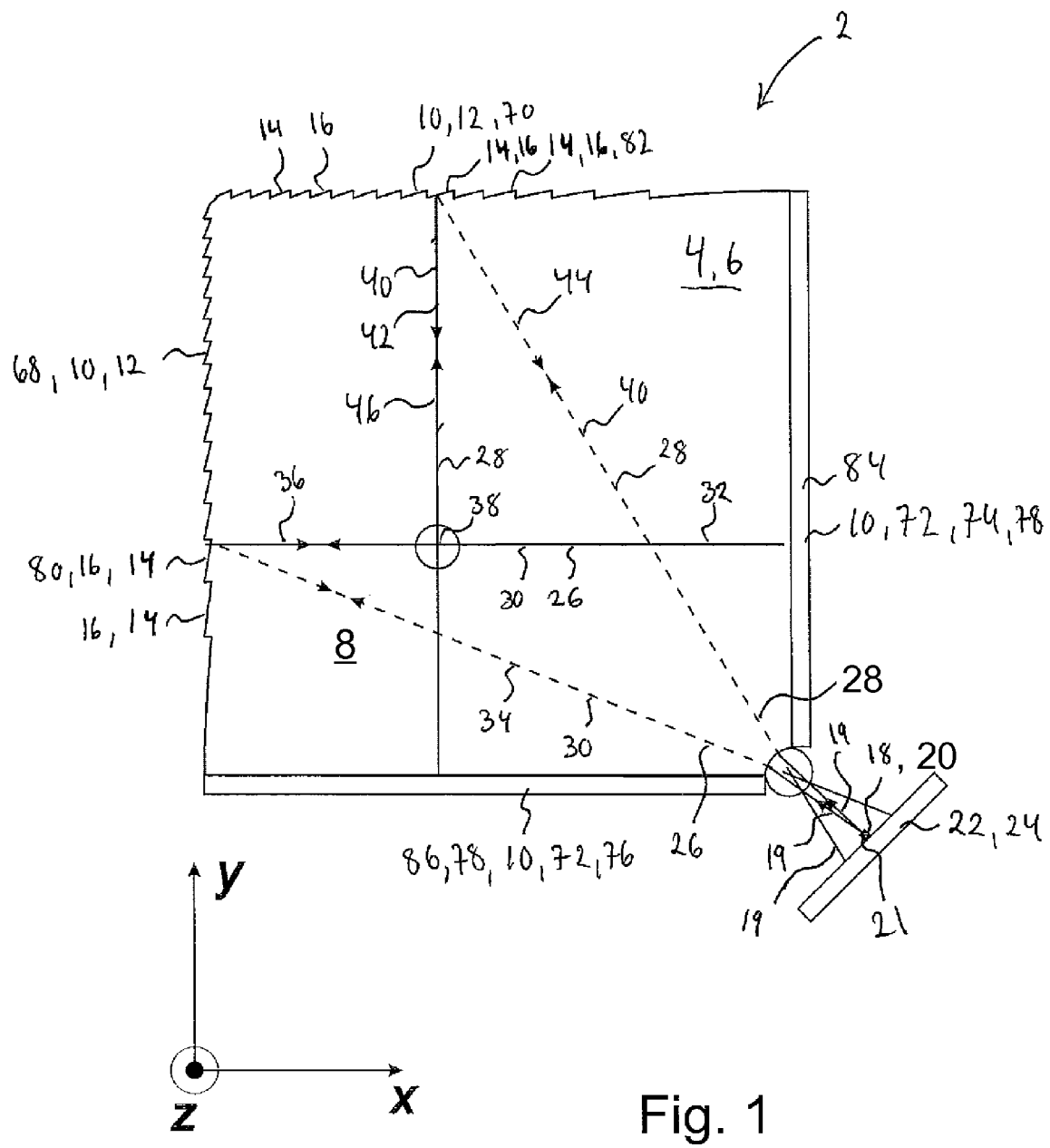
FIG. 1 schematically illustrates a top view of a first embodiment of a device according to the present invention, FIG. 2 schematically illustrates a cross sectional side view of a part of the first embodiment, FIG. 3 schematically illustrates a cross sectional side view of a part of an alternative to the first embodiment, FIG. 4 schematically illustrates a top view of the first embodiment, FIG. 5 schematically illustrates a cross sectional side view of a part of the first embodiment, FIG. 6 schematically illustrates a cross sectional side view of a part of an alternative to the first embodiment, FIG. 7 schematically illustrates a cross sectional side a part of view of an alternative to the first embodiment, FIGS. 8-9 schematically illustrate top views of the first embodiment, FIG. 10 schematically illustrates a top view of a second embodiment of a device according to the present invention, FIG. 11 schematically illustrates a cross sectional side view of a part of the second embodiment, FIG. 12 schematically illustrates a top view of the second embodiment, FIG. 13 schematically illustrates a cross sectional side view of a part of the second embodiment, FIGS. 14-15 schematically illustrate top views of the second embodiment, FIGS. 16-19 schematically illustrate top views of a third embodiment of a device according to the present invention, FIG. 20 schematically illustrates a top view of a fourth embodiment of a device according to the present invention, FIG. 21 schematically illustrates a cross sectional side view of parts of the fourth embodiment, FIG. 22 schematically illustrates a top view of the fourth embodiment, FIG. 23 schematically illustrates a cross sectional side view of parts of the fourth embodiment, FIGS. 24-27 schematically illustrate top views of the fourth embodiment, FIG. 28 schematically illustrates a top view of a fifth embodiment of a device according to the present invention, FIGS. 29-31 schematically illustrate a cross sectional side view of parts of the fifth embodiment, FIGS. 32-35 schematically illustrate the different reflections from FIGS. 29-31 in greater detail, FIGS. 36-37 schematically illustrate a cross sectional side views of a part of the fifth embodiment, FIG. 38 schematically illustrates a cross sectional side view of parts of an embodiment according to the present invention, FIG. 39 schematically illustrates an embodiment according to the present invention comprising a processor, FIG. 40 schematically illustrates an embodiment according to the present invention being part of a touch screen, and FIG. 41 schematically illustrates an embodiment of a method according to the present invention.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

A sensing zone according to the present invention is a zone, e.g. an area of the touch-surface, where a touch by for instance a finger, a stylus, etc. may disturb light guided by the planar waveguide along a path towards the at least one detector device.

Light (sometimes referred to as active light) propagating along an active path part may be adapted to be sufficiently disturbed by a touch at the touch-surface for provision of a touch coordinate.

Light (sometimes referred to as passive light) propagating along a passive path part may be adapted to be sufficiently undisturbed by a touch at the touch-surface such that a touch coordinate is not provided.

Thus, the difference between active and passive light may be that the active light is sensitive or at least is substantially sensitive to a touch at the touch-surface, whereas the passive light is not sensitive or at least is substantially not sensitive to a touch at the touch-surface. Thus, in the following, an active angle range in relation to the touch-surface may refer to the angle range needed for light to be active. Likewise, a passive angle range in relation to the touch-surface may refer to the angle range needed for light to be passive.

The active light may be adapted to experience total internal reflection at parts of the touch-surface that are not touched and may be sufficiently disturbed at a part of the touch-surface that is being touched by the object. The passive light may be adapted to experience total internal reflection at the touch-surface regardless of whether an object is touching the touch-surface or not.

Disturbance of first, second and third active light at a zone of intersection may provide first, second and third touch coordinate for the zone of intersection.

First active light may substantially illuminate the touch-surface. Second active light may substantially illuminate the touch surface. Third active light may substantially illuminate the touch-surface. Having the first, second, and third light that each substantially illuminates the touch-surface may provide a distribution of sensing zones substantially covering the touch-surface.

The waveguide and/or the light source and/or the detector device may comprise one or more of the features disclosed in WO 2009/086836. The redirecting structure may comprise one or more of the features of the redirecting member disclosed in WO 2009/086836.

The waveguide may comprise a glass cover. A surface of the glass cover may form the touch-surface of the waveguide.

The planar waveguide may be adapted for guiding first light along a first secondary path towards the first detector device. The first secondary path may comprise at least one active part and at least one passive part. The at least one active part of the first secondary path may comprise a first active part that may be within the first waveguide layer. The planar waveguide may be adapted for guiding second light along a second secondary path towards the at least one detector device. The second secondary path may comprise at least one active part and at least one passive part. The at least one active part of the second secondary path may comprise a first active part that may be within the first waveguide layer. The first active part of the second secondary path may intersect (or at least substantially intersect) the first active part of the first secondary path at a secondary zone of intersection. The planar waveguide may be adapted for guiding third light along a third secondary path towards the at least one detector device. The third secondary path may comprise at least one active part and at least one passive part. The at least one active part of the third secondary path may comprise a first active part that may be within the first waveguide layer. The first active part of the third secondary path may intersect (or at least substantially intersect) the first active part of the first secondary path and the first active part of the second secondary path at the secondary zone of intersection.

Provision of a primary zone of intersection having three intersecting light paths being active at the primary zone of intersection and provision of a secondary zone of intersection having three intersecting light paths being active at the zone of intersection may provide an improved detection of multiple (such as two) concurrent touches at the touch-surface. A first touch may generate three coordinates, e.g. $\{a_1, b_1, c_1\}$ and a second touch may generate three coordinates, e.g. $\{a_2, b_2, c_2\}$. The detector may detect $\{a_1, b_1, c_1, a_2, b_2, c_2\}$, however only the combinations $\{a_1, b_1, c_1\}$ and $\{a_2, b_2, c_2\}$ may provide two intersections and thus may provide the only possible coordinates for the two touches.

The first active part of the first primary path may be converging or diverging in relation to the first active part of the first secondary path. This may provide an angular coordinate.

The first active part of the second primary path may be substantially parallel to the first active part of the second secondary path. This may provide a first rectilinear two-dimensional coordinate.

The first active part of the third primary path may be substantially parallel to the first active part of the third secondary path. This may provide a second rectilinear two-dimensional coordinate.

The at least one light source may comprise a second light source adapted to generate the second light. The second light source may be adapted to generate the third light. The at least one light source may comprise one or more additional light sources.

The first light source and the second light source may be adapted to emit light into the planar waveguide sequentially. The sequence of emitting light into the planar waveguide by the first light source, the second light source, and possibly one or more additional light sources, may be repeated at a frequency higher than 5 Hz, such as higher than 15 Hz, such as higher than 25 Hz. It may be of importance that the frequency is adapted to the duration of a touch and to a possible displacement speed of a touch along the touch-surface of the device according to the present invention such that a sufficient determination of position of touch and/or displacement of position of touch may be achieved.

The first light source may be adapted to emit light within a first range of wavelengths into the planar waveguide. The second light source may be adapted to emit light within a second range of wavelengths into the planar waveguide. This may improve determination of which light paths that have been disturbed by a touch since the at least one detector device may be adapted to detect different wavelengths differently. This may in particular be of importance when the first, second and third light are existing in the planar waveguide simultaneously.

The at least one light source may be adapted to emit light into the planar waveguide in pulses. The pulses may be of less than 100 ms of light. The pulses may be repeated at a frequency higher than 5 Hz, such as higher than 15 Hz, such as higher than 25 Hz. This may reduce energy consumption by the device during operation.

The at least one detector device may comprise a second detector device adapted to detect light from the second light source. Having a second detector device for detecting light from the second light source may improve distinguishing between detected first light and detected second and or third light, which in turn may improve detection of position of touch.

The first detector device may be situated at an opposite part of the planar waveguide in relation to the first light source.

This may provide an improved tolerance towards unwanted disturbance of light propagation.

The second detector device may be situated at an opposite part of the planar waveguide in relation to the first detector device. The second detector device may be adapted to receive light from the planar waveguide that exits from an opposite part of the planar waveguide in relation to the first detector device. The situated opposite part and/or the opposite part for receiving may be an opposite corner of the planar waveguide. The first detector device may be situated at the second light source and the second detector device may be situated at the first light source.

The touch-sensitive device may be adapted to disperse first light towards the first redirecting structure. The touch-sensitive device may comprise at least one dispersion structure comprising a first dispersion structure that may be adapted to disperse first light towards the first redirecting structure.

The first (and/or the second) dispersion structure may comprise a first dispersion surface of the planar waveguide having a concave shape in a plane parallel to the planar waveguide and/or in a plane perpendicular to the planar waveguide. A plane parallel to the planar waveguide may for instance be the touch-surface. Provision of a concave dispersion structure in a plane parallel to the planar waveguide may improve dispersion of light from the at least one light source towards the at least one redirecting structure. Provision of a concave dispersion structure in a plane perpendicular to the planar waveguide may improve dispersion of light from the at least one light source in an angle range in relation to the touch-surface.

The first dispersion structure may be adapted for transmission of first light through the first dispersion structure towards the first redirecting structure. A dispersion structure for transmission may be situated at a zone of entrance of light from at least one of the at least one light source.

The first dispersion structure may be adapted for reflection of first light towards the first redirecting structure. A dispersion structure for reflection may be situated at a far edge of the planar waveguide in relation to the zone of entrance of light into the planar waveguide from at least one of the at least one light source.

The at least one dispersion structure may comprise a second dispersion structure adapted to disperse second light towards the at least one redirecting structure and preferably adapted to disperse third light towards the at least one redirecting structure.

The second dispersion structure may be adapted to generate and/or disperse second light and third light by dispersion of light from the first light source.

The second dispersion structure may be adapted to generate and/or disperse second light and third light by dispersion of light from the second light source.

The planar waveguide may comprise a second waveguide layer adapted for guiding passive light. The planar waveguide may comprise a second waveguide layer adapted for guiding light along at least one part of the at least one passive part of the first primary path, at least one part of the at least one passive part of the second primary path, and at least one part of the at least one passive part of the third primary path. The planar waveguide may comprise a third waveguide layer adapted for guiding passive light.

The planar waveguide may comprise at least one transmission surface at the at least one edge of the planar waveguide for transmitting light towards the at least one detector device. The at least one transmission surface may comprise a first transmission surface for transmitting light towards the first detector device.

The first transmission surface may comprise a surface of the planar waveguide having a convex shape in a plane parallel to the planar waveguide and/or in a plane perpendicular to the planar waveguide.

The touch-sensitive device may be adapted such that first light, when propagating along the first active part of the first primary path, is within an active angle range in relation to the touch-surface. The active angle range may be a range of angles being smaller than the critical angle of the planar waveguide in relation to a normal of the touch-surface, e.g. for a part of the touch-surface being touched by an object. The critical angle for light guided by a planar waveguide is explained in WO 2009/086836.

The touch-sensitive device may be adapted such that first light, when propagating along the at least one passive part of the first primary path, is within a passive angle range in relation to the touch-surface. The passive angle range may be a range of angles being larger than the critical angle of the planar waveguide in relation to a normal of the touch-surface, e.g. for a part of the touch-surface being touched by an object.

The first edge may comprise a first primary edge and a first secondary edge. The at least one edge may comprise a second edge comprising a second primary edge and a second secondary edge. The at least one redirecting structure may comprise a second redirecting structure. The first redirecting structure may comprise a first primary redirecting structure arranged at the first primary edge and a first secondary redirecting structure arranged at the first secondary edge. The second redirecting structure may comprise a second primary redirecting structure arranged at the second primary edge and a second secondary redirecting structure arranged at the second secondary edge. The first redirecting structure may be adapted to redirect first primary light towards the second redirecting structure.

The second primary redirecting structure may comprise a retroreflecting structure. The second secondary redirecting structure may comprise a retroreflecting structure. A retroreflecting structure of the device may be adapted such that light from the first redirecting structure may be redirected back to the first redirecting structure for being redirected by the first redirecting structure towards the at least one light detector device.

The first redirecting structure may be adapted to redirect first light, e.g. from the first dispersion structure, towards the second edge and may be adapted to modify the angle range that the incident light forms in relation to the touch-surface.

The first primary redirecting structure may comprise at least one reflecting surface that may be tilted in relation to a normal of the touch-surface, such that the at least one reflecting surface may form an angle relative to the touch-surface within a range of 60°-89°, such as an angle within a range of 70°-86°, such as an angle within a range of 76°-82°.

The first primary redirecting structure may comprise at least one reflecting surface forming approximately a right angle with the touch-surface.

The touch-sensitive device may comprise a processor adapted for position encoding the primary zone of intersection based on light intensities received by the at least one detector device. The processor may be adapted for position encoding the secondary zone of intersection based on light intensities received by the at least one detector device.

A width of the first light detector device may be at least 5 times smaller than a first diagonal of the planar waveguide, such as at least 10 times smaller than the first diagonal of the planar waveguide, such as at least 15 times smaller than the first diagonal of the planar waveguide.

The touch-sensitive device may be part of a touch screen, e.g. incorporated in an optical table or a handheld device such as a handheld device may comprise at least one of a mobile phone, a pda, and a portable music player.

Detecting touch according to the present invention may comprise detecting the local force (i.e. the normal force) that the object applies to the surface. This may for instance be carried out by utilizing that a finger or another object may increase contact area and/or contact quality in response to an increased normal force of the object (i.e. a finger or another object) touching the touch-surface. Thus, the amount of light disturbance may increase with increased force applied.

Throughout the figures, active light and/or active parts of paths are illustrated by solid lines within the planar waveguide and passive light and/or passive parts of paths are illustrated by broken lines within the planar waveguide.

FIGS. 1-9 schematically illustrate top views and cross sectional side views of a first embodiment of a device 2 according to the present invention and alternatives to parts of the first embodiment. FIG. 1 schematically illustrates a top view of the first embodiment of the device 2 according to the present invention.

FIG. 1 illustrates a touch-sensitive device 2 comprising a planar waveguide 4 comprising a first waveguide layer 6, a touch-surface 8 being arranged at the first waveguide layer 6, and at least one edge 10 comprising a first edge 12. The touch-sensitive device 2 comprises at least one redirecting structure 14 comprising a first redirecting structure 16 arranged at the first edge 12 and at least one light source 18 adapted to emit light 19 into the planar waveguide 4. The at least one light source 18 comprises a first light source 20. The touch-sensitive device 2 comprises at least one detector device 22 adapted to detect light from the at least one light source 18. The at least one detector device 22 comprises a first detector device 24 adapted to detect light 19 from the first light source 20.

Figure 4:
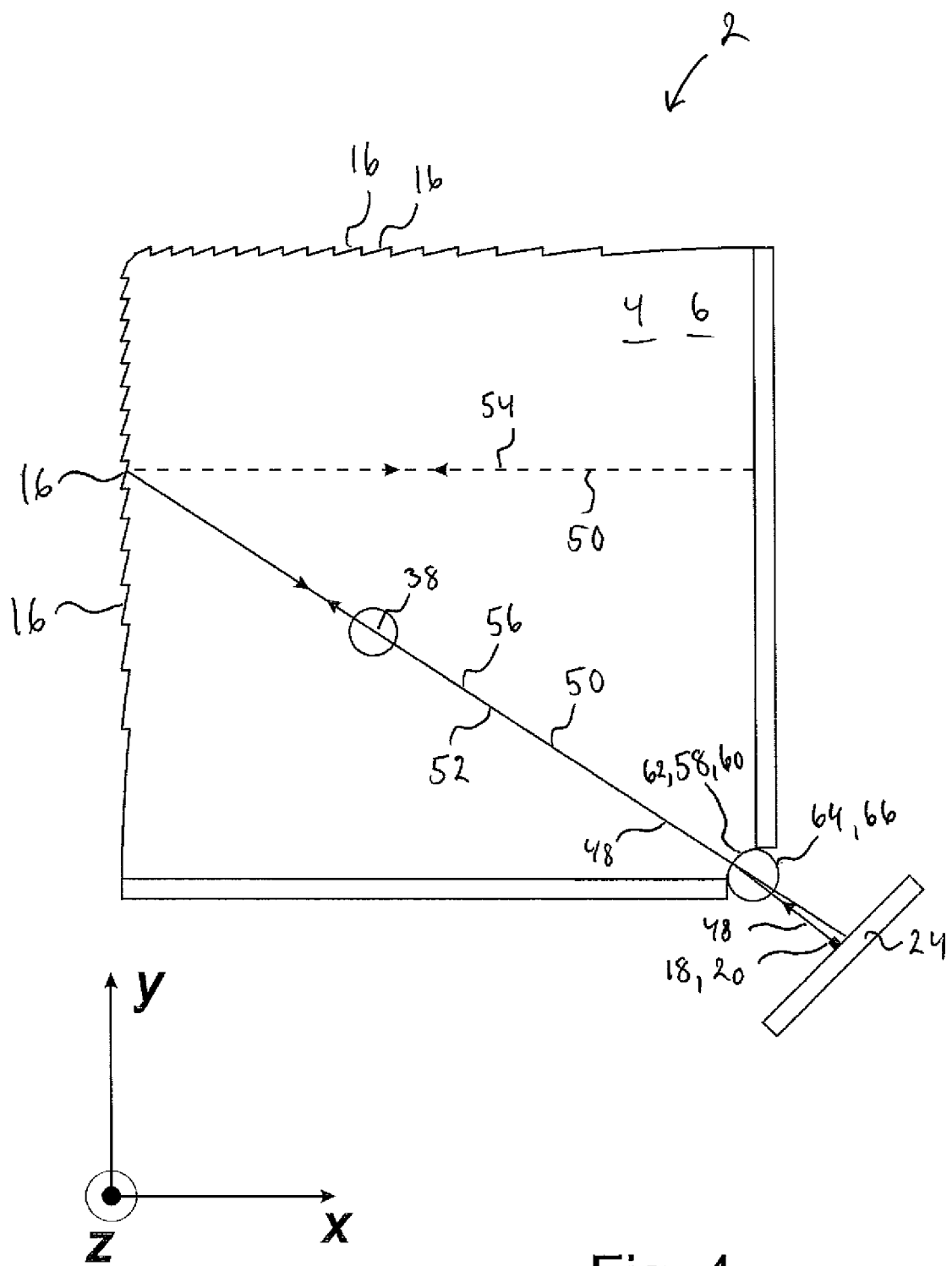

FIGS. 1 and 4 illustrate top views of the first embodiment of the device 2 illustrating different light paths. The illustrated paths in FIGS. 1 and 4 are coexisting. However, light propagating along the paths may be or may not be coexisting.

In FIG. 4 it is illustrated that the first light source 20 is adapted to generate first light 48. The touch-sensitive device 2 is adapted to guide first light 48 towards the first redirecting structure 16. The planar waveguide 4 is adapted for guiding first light 48 along a first primary path 50 towards the first detector device 24, the first primary path 50 comprises at least one active part 52 and at least one passive part 54. The at least one active part 52 of the first primary path 50 comprises a first active part 56 being within the first waveguide layer 6.

In FIG. 1 it is illustrated that the touch-sensitive device 2 is adapted to generate second light 26. The planar waveguide is adapted for guiding second light 26 along a second primary path 30 towards the at least one detector device 22. The second primary path 30 comprises at least one active part 32 and at least one passive part 34. The at least one active part 32 of the second primary path comprises a first active part 36 being within the first waveguide layer 6. The first active part 36 of the second primary path 30 intersects the first active part of the first primary path (see FIG. 4) at a primary zone of intersection 38.

In FIG. 1 it is illustrated that the touch-sensitive device 2 is adapted to generate third light 28. The planar waveguide is adapted for guiding third light 28 along a third primary path 40 towards the at least one detector device 22. The third primary path 40 comprises at least one active part 42 and at least one passive part 44. The at least one active part 42 of the third primary path 40 comprises a first active part 46 being within the first waveguide layer 6. The first active part 46 of the third primary path 40 intersects a first active part of a first primary path (see FIG. 4) and the first active part 36 of the second primary path 30 at the primary zone of intersection 38.

The touch-sensitive device 2 as illustrated in FIG. 4 is adapted to disperse first light 48 towards the first redirecting structure 16. However, in FIG. 4 only a single light path is illustrated.

The touch-sensitive device 2 comprises at least one dispersion structure 58 comprising a first dispersion structure 60 adapted to disperse first light 48 towards the first redirecting structure 16.

With reference to FIGS. 1, 2, 4 and 5: The first dispersion structure 60 comprises a first dispersion surface 62 of the planar waveguide having a concave shape in a plane parallel to the planar waveguide. The first dispersion structure 60 is adapted for transmission of first light 48 through the first dispersion structure 60 towards the first redirecting structure 16. The planar waveguide 4 comprises at least one transmission surface 64 at the at least one edge of the planar waveguide 4 for transmitting light towards the at least one detector device 22. The at least one transmission surface 64 comprises a first transmission surface 66 for transmitting light towards the first detector device 24. The first transmission surface comprises 66 a surface of the planar waveguide having a convex shape in a plane parallel to the planar waveguide 4. The touch-sensitive device 2 is adapted such that first light 48, when propagating along the first active part 56 of the first primary path, is within an active angle range in relation to the touch-surface 8, and adapted such that first light 48, when propagating along the at least one passive part 54 of the first primary path, is within a passive angle range in relation to the touch-surface 8. The active angle range is a range of angles being smaller than the critical angle of the planar waveguide 4 in relation to a normal of the touch-surface 8, e.g. for a part of the touch-surface being touched by an object. The passive angle range is a range of angles being larger than the critical angle of the planar waveguide 4 in relation to a normal of the touch-surface, e.g. for a part of the touch-surface being touched by an object.

The first edge 12 comprises a first primary edge 68 and a first secondary edge 70. The at least one edge 10 comprises a second edge 72 comprising a second primary edge 74 and a second secondary edge 76. The at least one redirecting structure 14 comprises a second redirecting structure 78. The first redirecting structure 16 comprises a first primary redirecting structure 80 arranged at the first primary edge 68 and a first secondary redirecting structure 82 arranged at the first secondary edge 70. The second redirecting structure 78 comprises a second primary redirecting structure 84 arranged at the second primary edge 74 and a second secondary redirecting structure 86 arranged at the second secondary edge 76. The first redirecting structure 16 is adapted to redirect first primary light 48 towards the second redirecting structure 78.

The second primary redirecting structure 84 comprises a retroreflecting structure. The second secondary redirecting structure 86 comprises a retroreflecting structure.

Each of the first primary redirecting structure 80 and the first secondary redirecting structure 82 comprises at least one reflecting surface being tilted in relation to a normal of the touch-surface, such that the at least one reflecting surface of the respective redirecting structure forms an angle relative to the touch-surface within a range of 60°-89°

Figure 2:
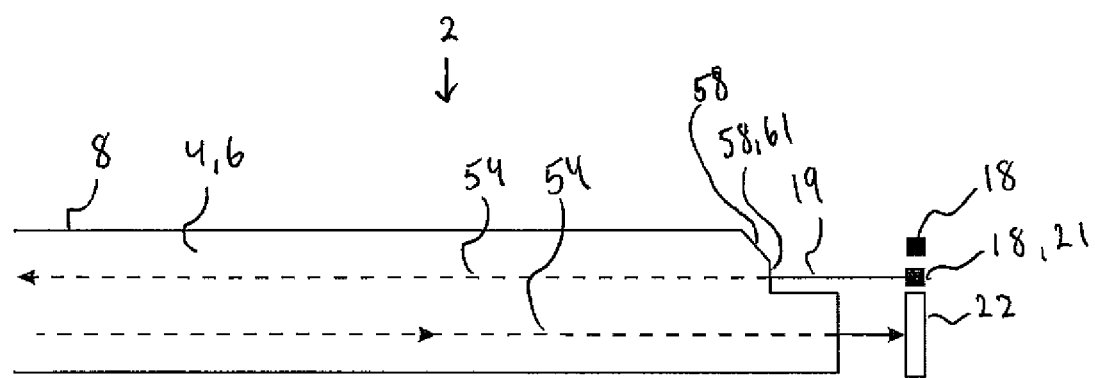

FIG. 2 schematically illustrates a cross sectional side view of a part of the first embodiment. The cross sectional side view is parallel with the z-axis illustrated in FIG. 1. FIG. 2 illustrates the at least one light source 18 comprising a second light source 21 adapted to generate the second light 26. The second light source 21 is adapted to generate the third light 28. The at least one dispersion structure 58 comprises a second dispersion structure 61 adapted to disperse second light towards the at least one redirecting structure and adapted to disperse third light towards the at least one redirecting structure.

Figure 3:
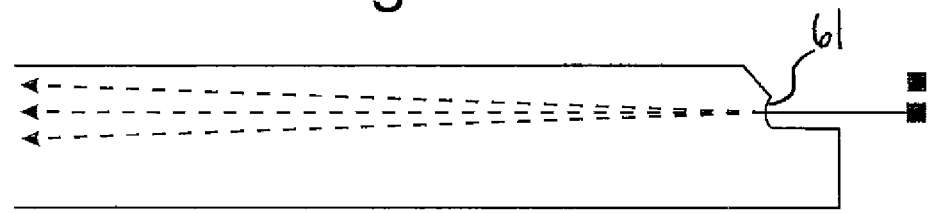

FIG. 3 schematically illustrates a cross sectional side view of a part of an alternative to the first embodiment. The second dispersion structure 61 comprises a second dispersion surface of the planar waveguide having a concave shape in a plane perpendicular to the planar waveguide.

Figure 5:
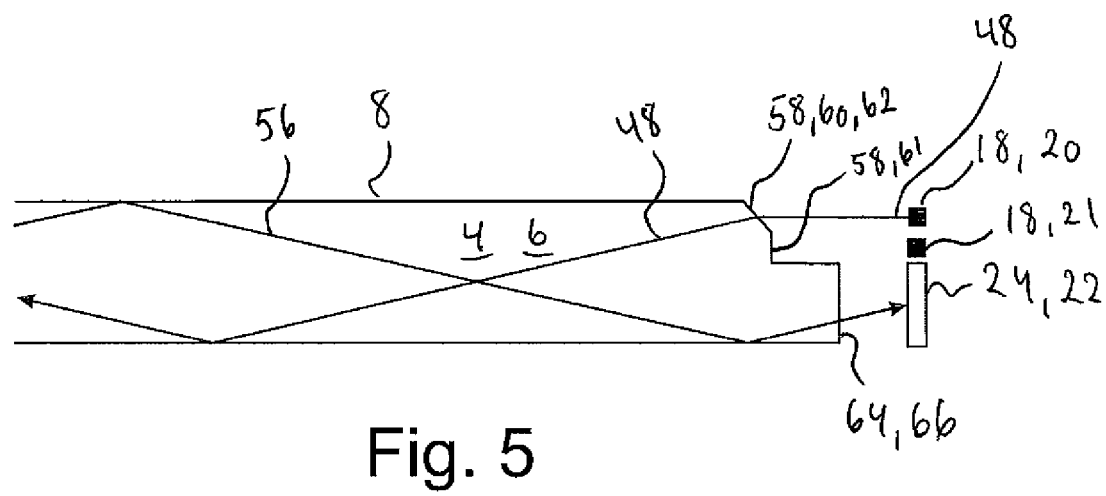

FIG. 5 schematically illustrates a cross sectional side view of a part of the first embodiment. The first light source 20 and the second light source 21 are adapted to emit light into the planar waveguide 4 sequentially. In an alternative embodiment, the second dispersion structure is adapted to generate second light and third light by dispersion of light from the first light source.

Figure 6:
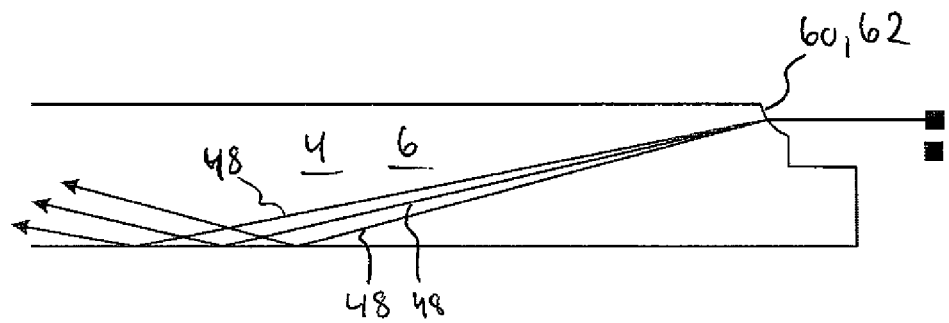

FIG. 6 schematically illustrates a cross sectional side view of a part of an alternative to the first embodiment. The first dispersion structure 60 comprises a first dispersion surface 62 of the planar waveguide 4 having a concave shape in a plane perpendicular to the planar waveguide 4.

For an alternative to the embodiments illustrated in FIGS. 1-6, where the generation of the passive and active angle ranges are affected or caused by the first and second dispersion structures 60 and 61, respectively, which incline in relation to each other, the at least one dispersion structure 58 may comprise a single dispersion structure or may comprise dispersion structures that do not incline in relation to each other. Thus, light from the first and second light sources respectively may be incident on the at least one dispersion structure 58 from different angles. A combination of these two alternatives may be provided according to the present invention for generation of passive and active light.

Figure 7:
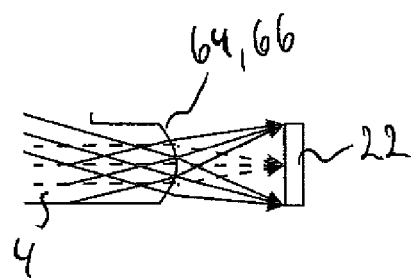

FIG. 7 schematically illustrates a cross sectional side a part of view of an alternative to the first embodiment, wherein the first transmission surface 66 comprises a surface of the planar waveguide 4 having a convex shape in a plane perpendicular to the planar waveguide 4. Light arriving at the first transmission surface 66 at different angles relative to the touch-surface may be directed towards different zones of the at least one detector device 22.

Figure 8:
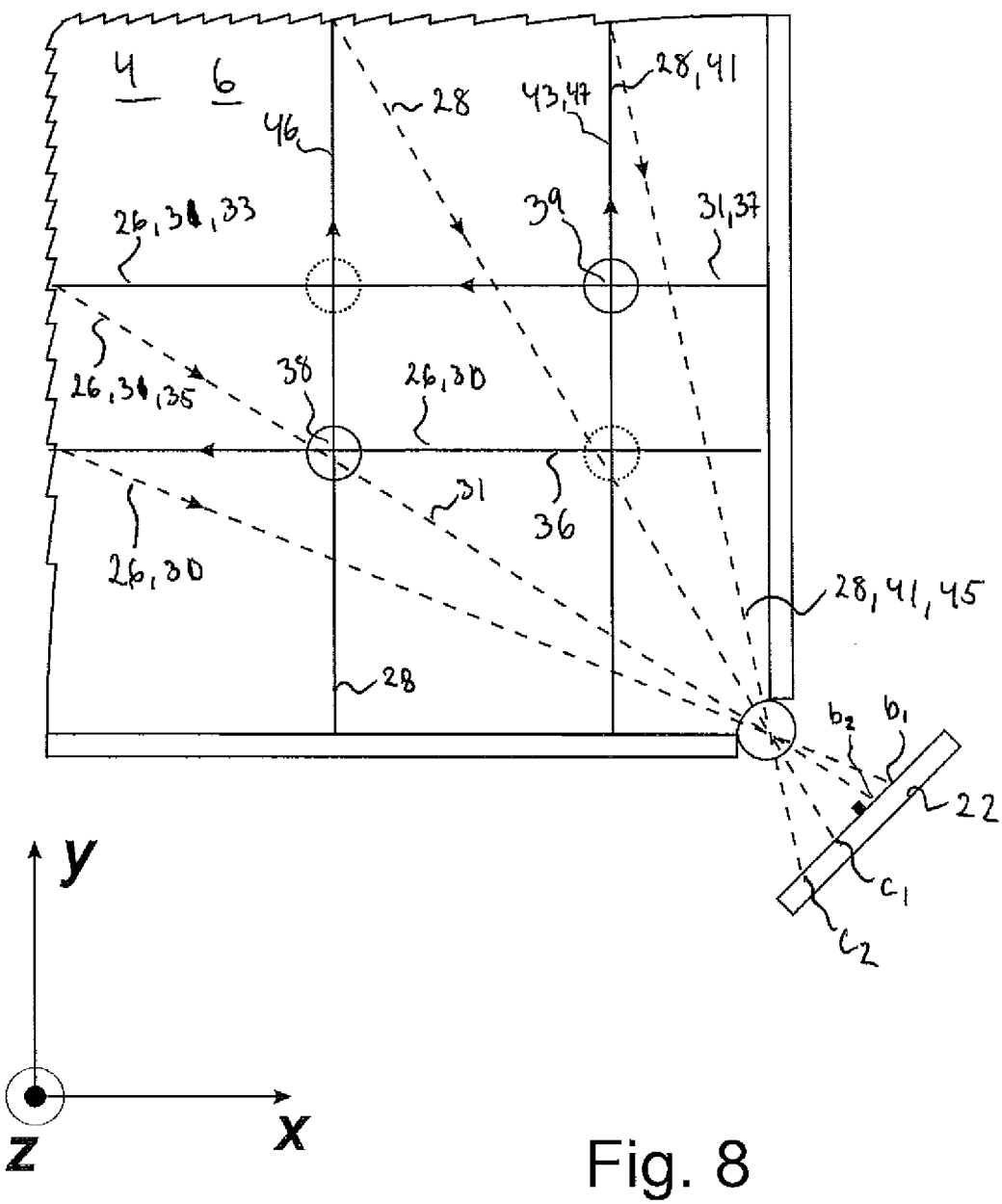
Figure 9:
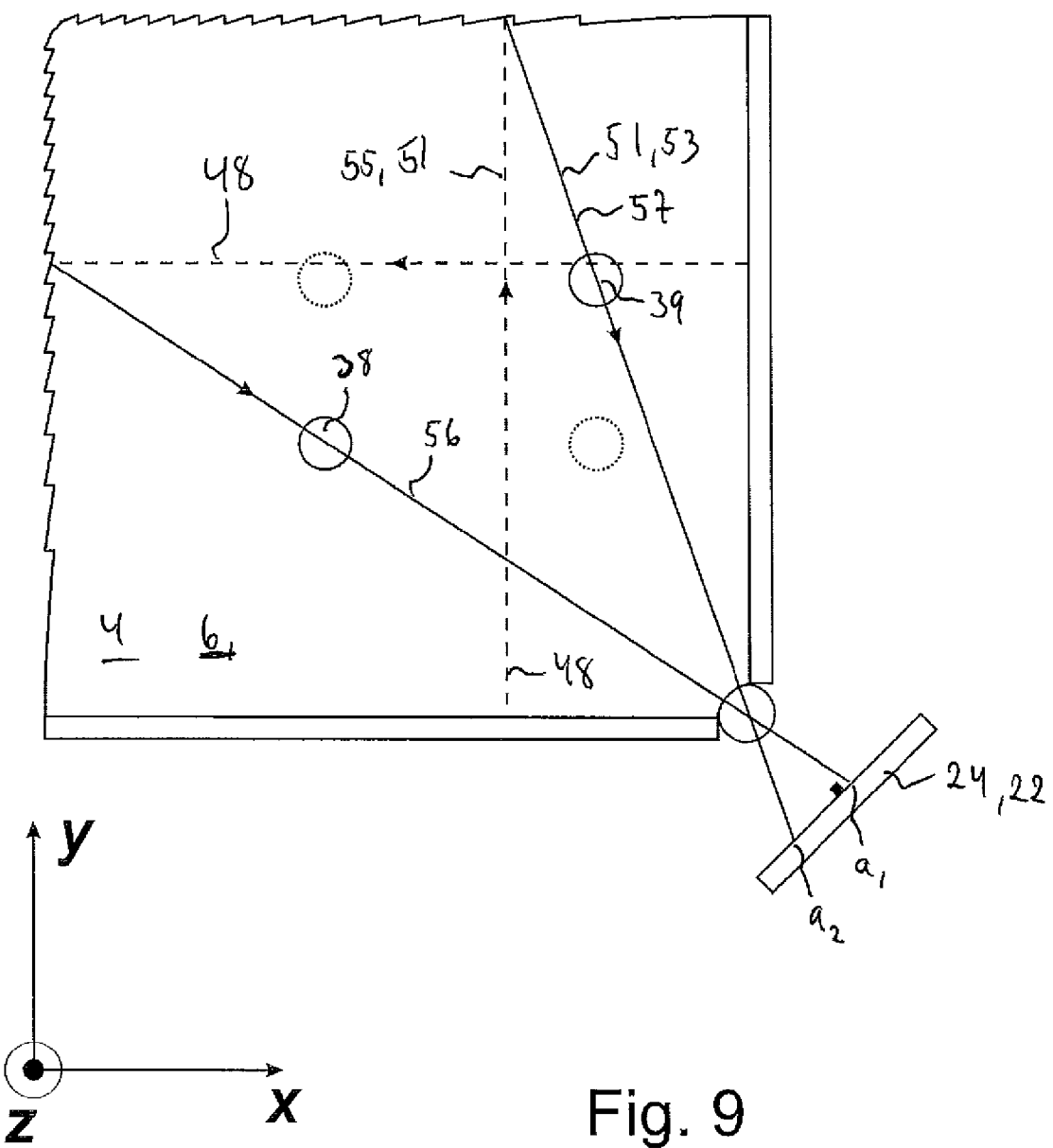
Figure 10:
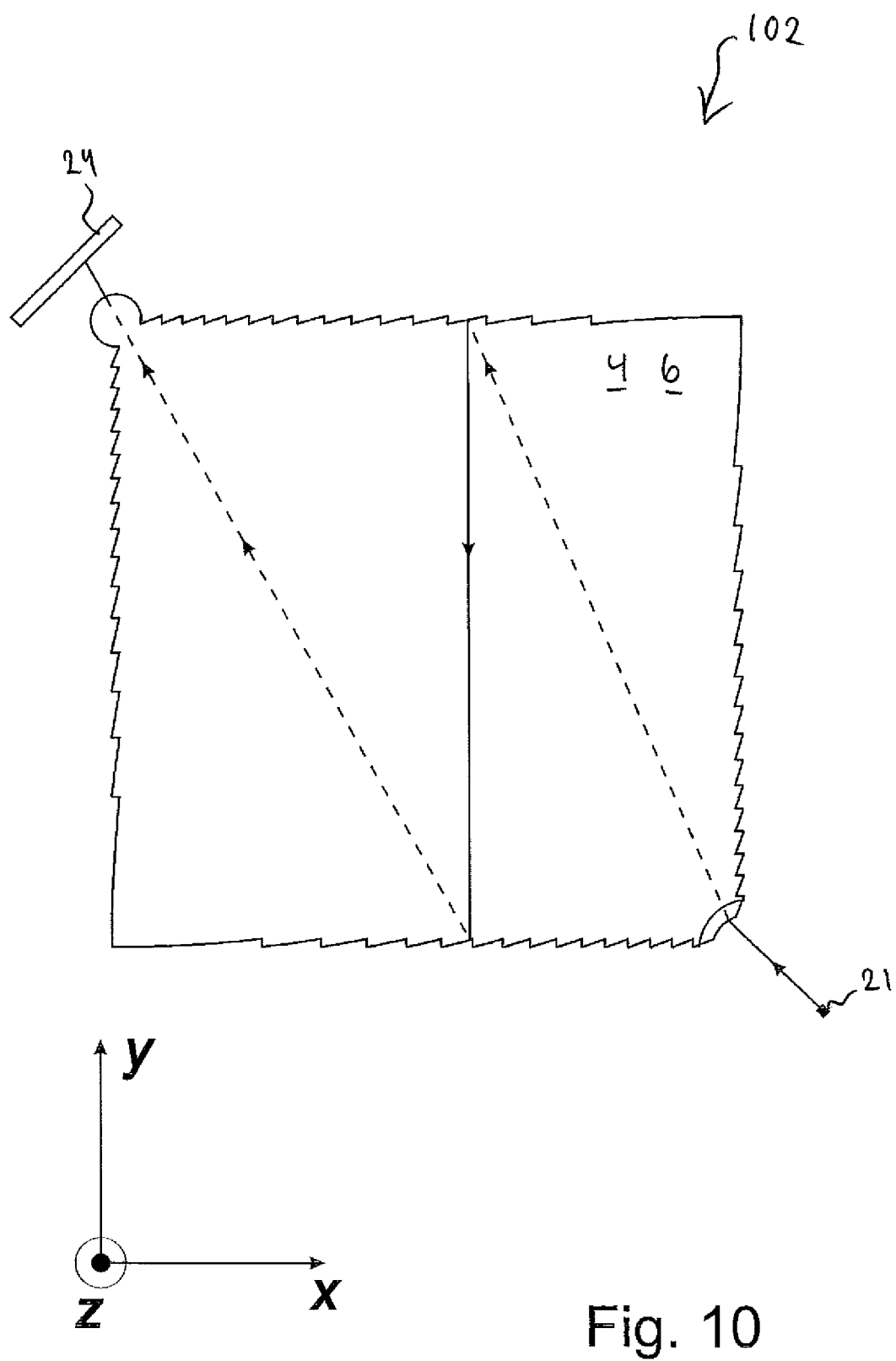
Figure 11:
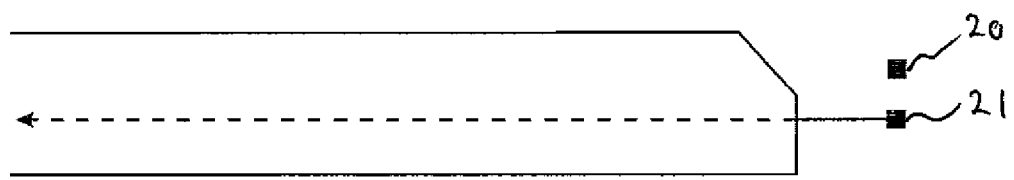
Figure 12:
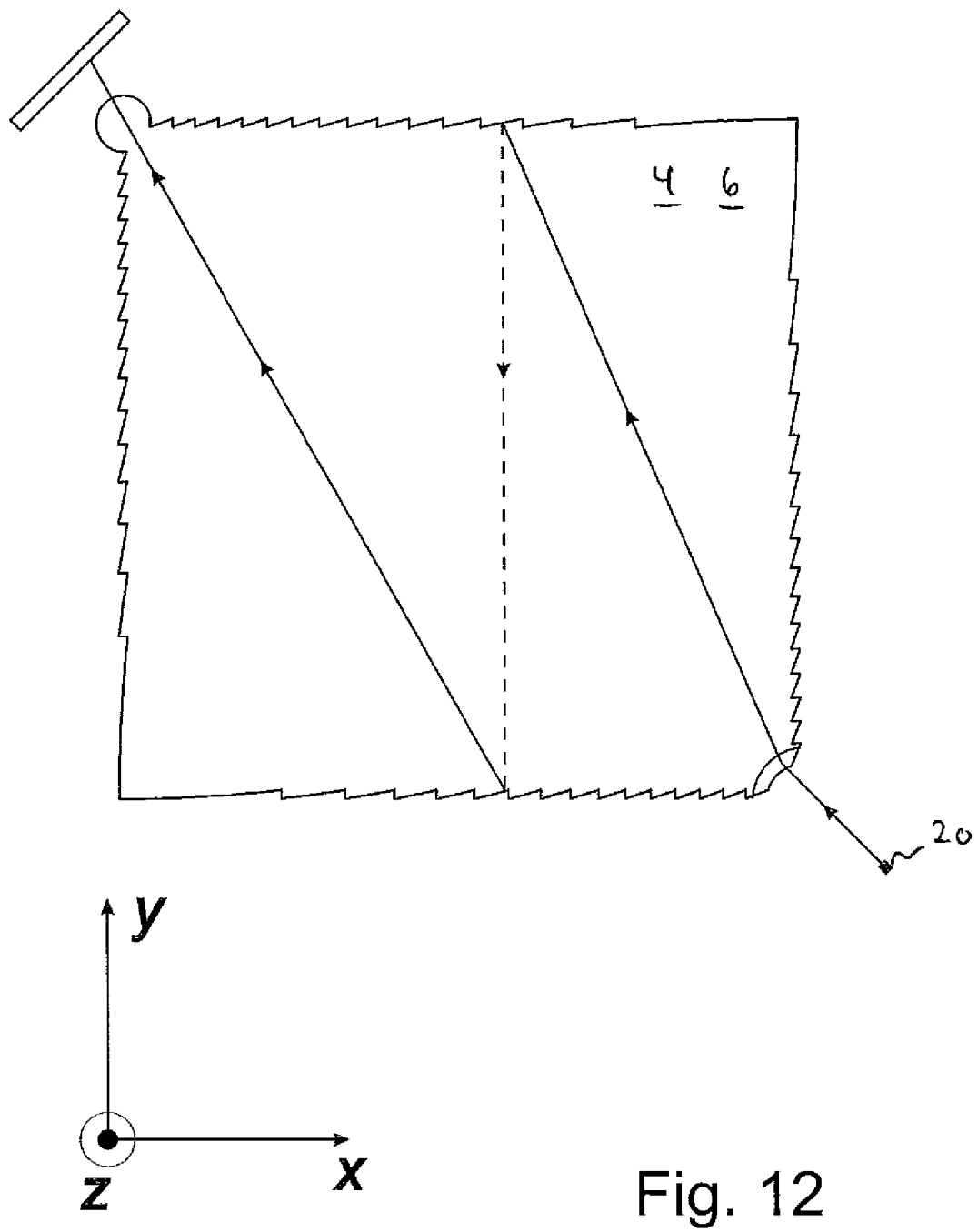
Figure 13:
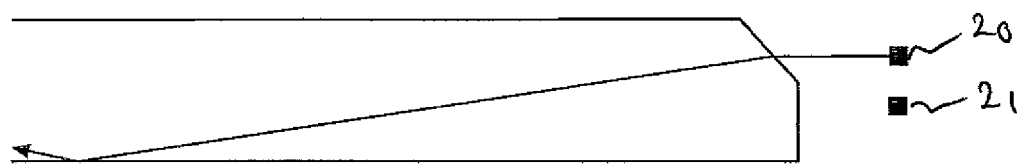

FIGS. 8-9 schematically illustrate top views of the first embodiment. The light paths mentioned in connection with FIGS. 8-9 are for convenience illustrated in two figures. However, the device is adapted for the existence of the light paths in the same device. For simplicity in FIGS. 8-9, only some parts of light paths from light source to detector device are illustrated. The planar waveguide 4 is adapted for guiding first light 48 along a first secondary path 51 towards the first detector device 24. The first secondary path 51 comprises at least one active part 53 and at least one passive part 55. The at least one active part 53 of the first secondary path 51 comprises a first active part 57 being within the first waveguide layer 6. The planar waveguide 4 is adapted for guiding second light 26 along a second secondary path 31 towards the at least one detector device 22. The second secondary path 31 comprises at least one active part 33 and at least one passive part 35. The at least one active part 33 of the second secondary path comprises a first active part 37 being within the first waveguide layer 6. The first active part 37 of the second secondary path 31 intersects the first active part 57 (see FIG. 9 in connection with FIG. 8) of the first secondary path 51 at a secondary zone of intersection 39. The planar waveguide 4 is adapted for guiding third light 28 along a third secondary path 41 towards the at least one detector device 22. The third secondary path 41 comprises at least one active part 43 and at least one passive part 45. The at least one active part 43 of the third secondary path comprises a first active part 47 being within the first waveguide layer 6. The first active part 47 of the third secondary path intersects the first active part 57 of the first secondary path (see FIG. 9 in connection with FIG. 8) and the first active part 37 of the second secondary path at the secondary zone of intersection 39. The first active part 56 of the first primary path is converging in relation to the first active part 57 of the first secondary path. The first active part 36 of the second primary path is substantially parallel to the first active part 37 of the second secondary path. The first active part 46 of the third primary path is substantially parallel to the first active part 47 of the third secondary path.

Provision of a primary zone of intersection 38 having three intersecting light paths being active at the primary zone of intersection 38 and provision of a secondary zone of intersection 39 having three intersecting light paths being active at the zone of intersection 39 provides an improved detection of multiple (such as two) concurrent touches at the touch-surface 8 as illustrated. A first touch at the first zone of intersection 38 may generate three coordinates, e.g. $\{a_1, b_1, c_1\}$ and a second touch at the second zone of intersection 29 may generate three coordinates, e.g. $\{a_2, b_2, c_2\}$. The detector may detect $\{a_1, b_1, c_1, a_2, b_2, c_2\}$, however only the combinations $\{a_1, b_1, c_1\}$ and $\{a_2, b_2, c_2\}$ may provide two intersections and thus may provide the only possible coordinates for the two touches. If only the coordinates $\{b_1, c_1, b_2, c_2\}$ were detected, the two touch positions generating the touch coordinates may as well be the ones enclosed by the dotted circles illustrated in FIGS. 8 and 9.

A similar principle for detection of two touches existing simultaneously as explained in connection with FIGS. 8 and 9 may be applied to the other embodiments according to the present invention.

FIGS. 10-15 schematically illustrate top views and cross sectional side views of a second embodiment of a device 102 according to the present invention. FIGS. 10, 12, 14 and 15 schematically illustrates a top view of the second embodiment of the device 102 according to the present invention.

The touch-sensitive device 102 comprises a planar waveguide 4 comprising a first waveguide layer 6, a touch-surface 8 being arranged at the first waveguide layer 6, and at least one edge 10 comprising a first edge 12. The touch-sensitive device 102 comprises at least one redirecting structure 14 comprising a first redirecting structure 16 arranged at the first edge 12 and at least one light source 18 adapted to emit light 19 into the planar waveguide 4. The at least one light source 18 comprises a first light source 20. The touch-sensitive device 102 comprises at least one detector device 22 adapted to detect light from the at least one light source 18. The at least one detector device 22 comprises a first detector device 24 adapted to detect light 19 from the first light source 20.

Figure 14:
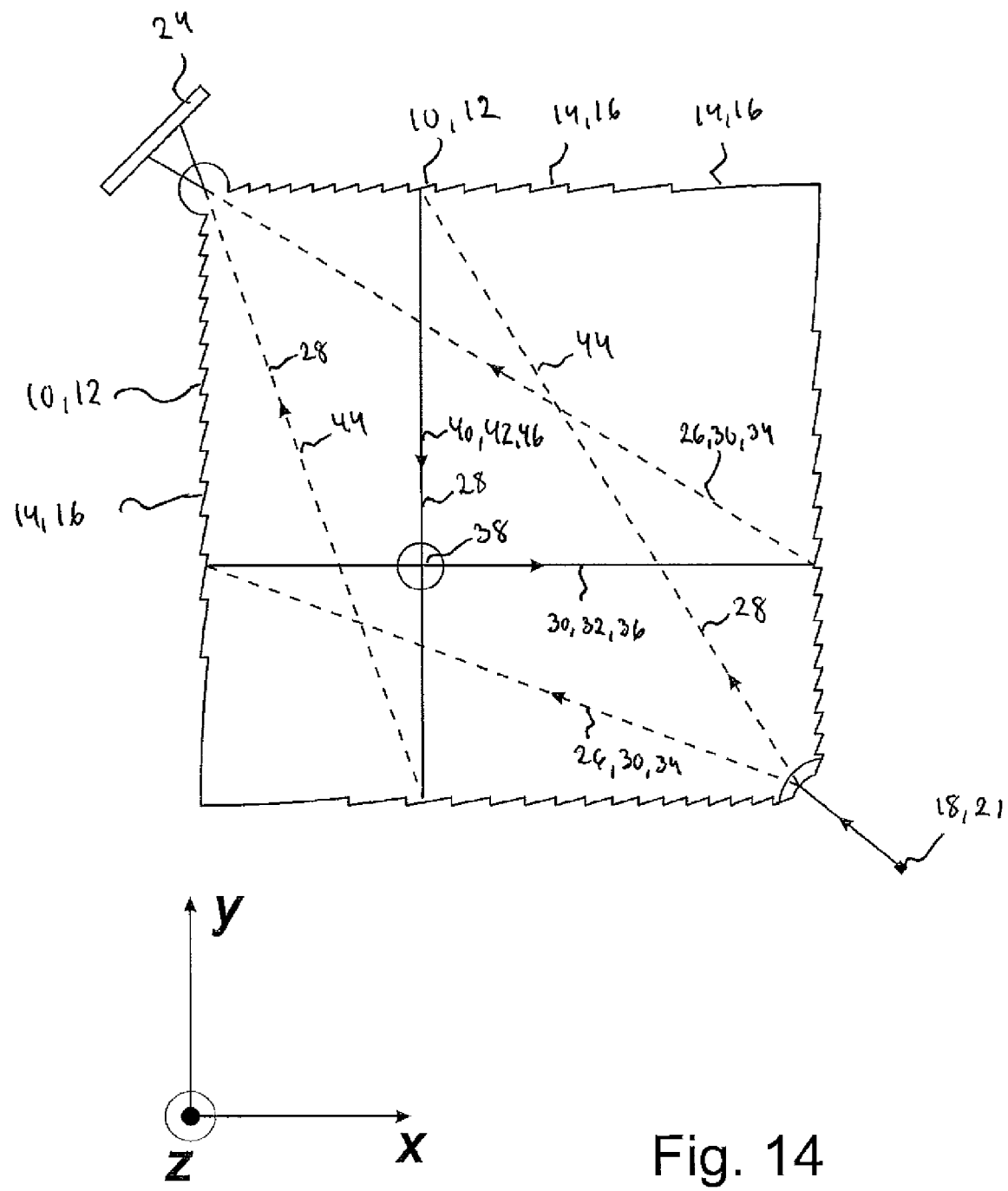
Figure 15:
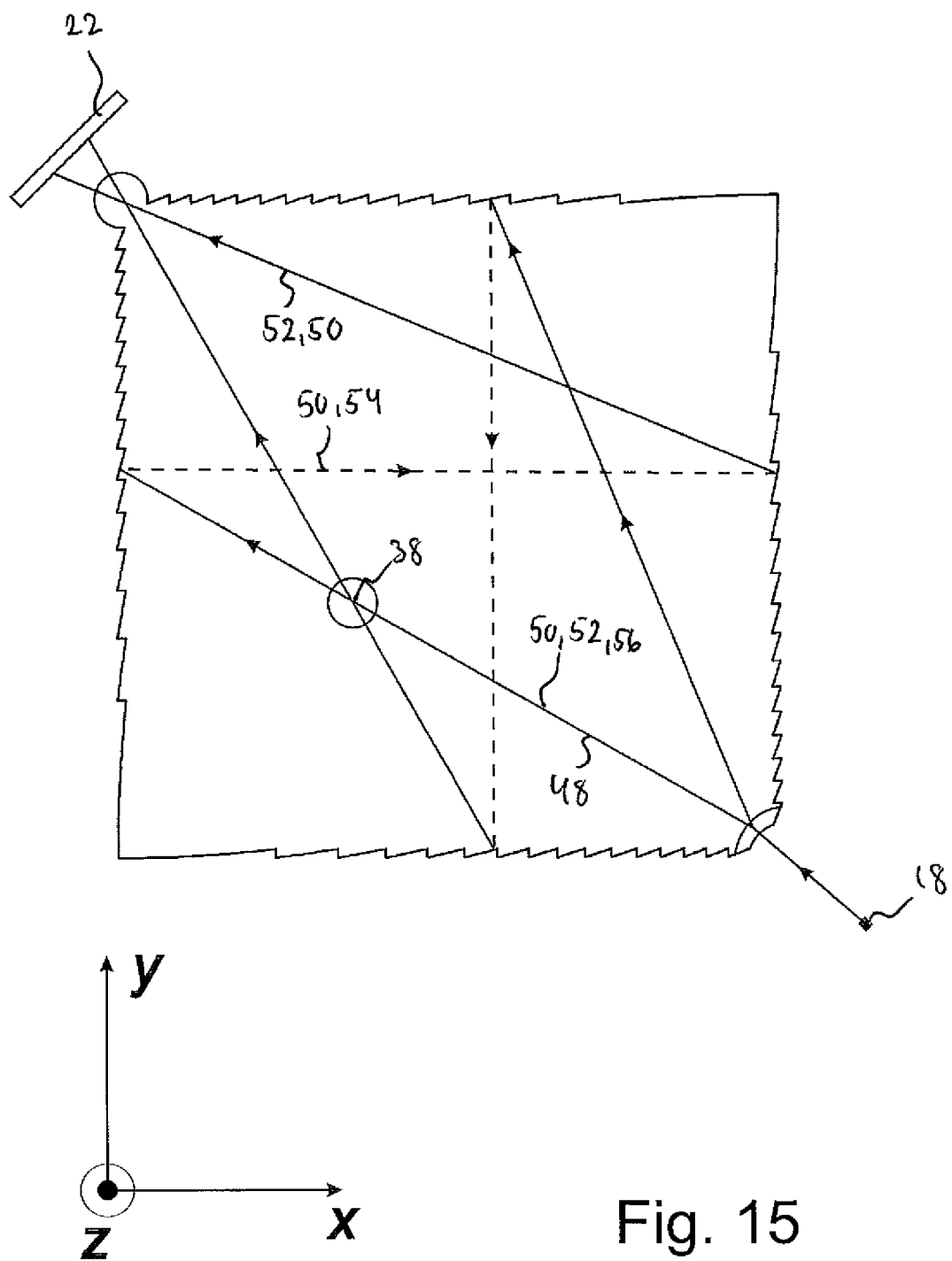
Figure 16:
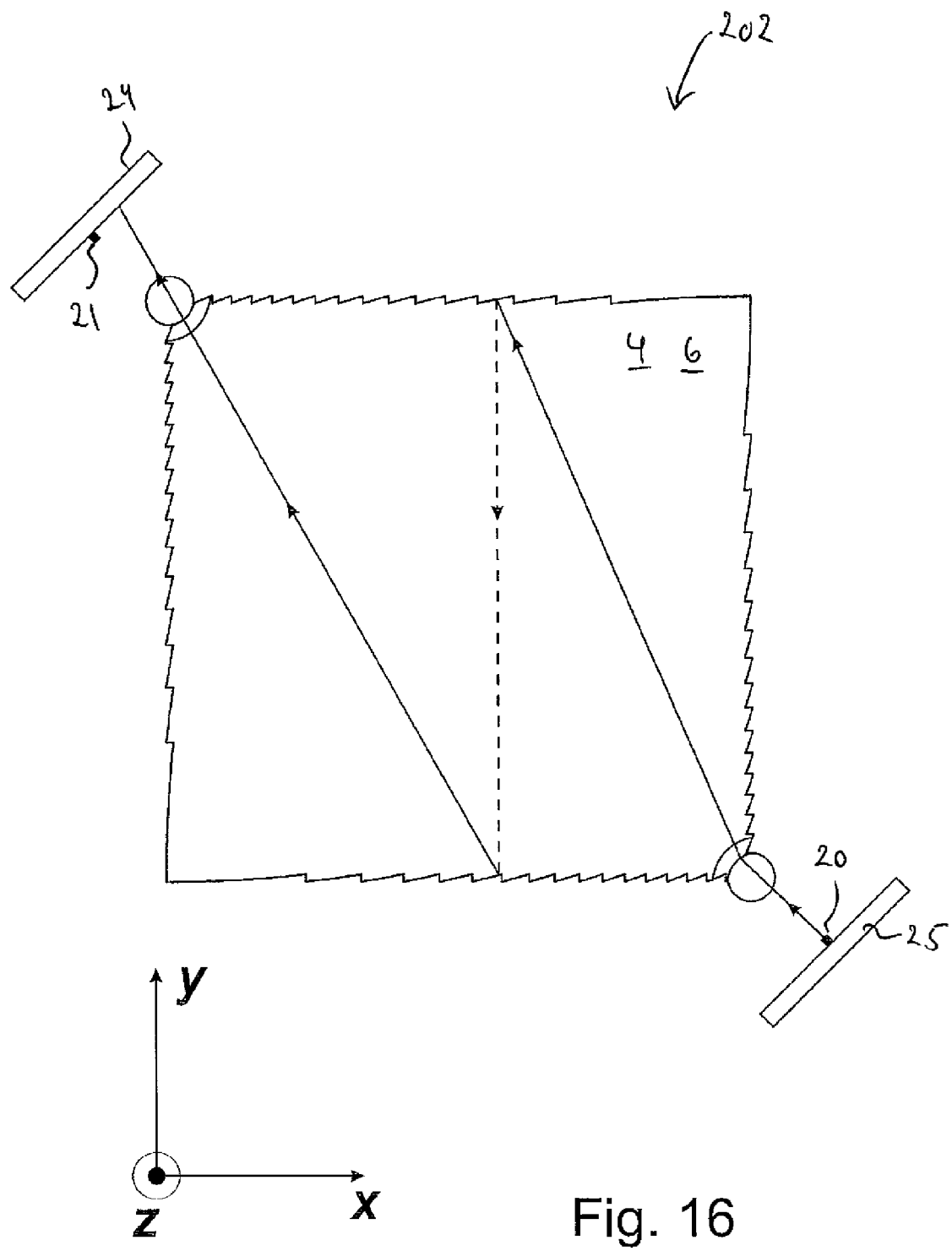
Figure 17:
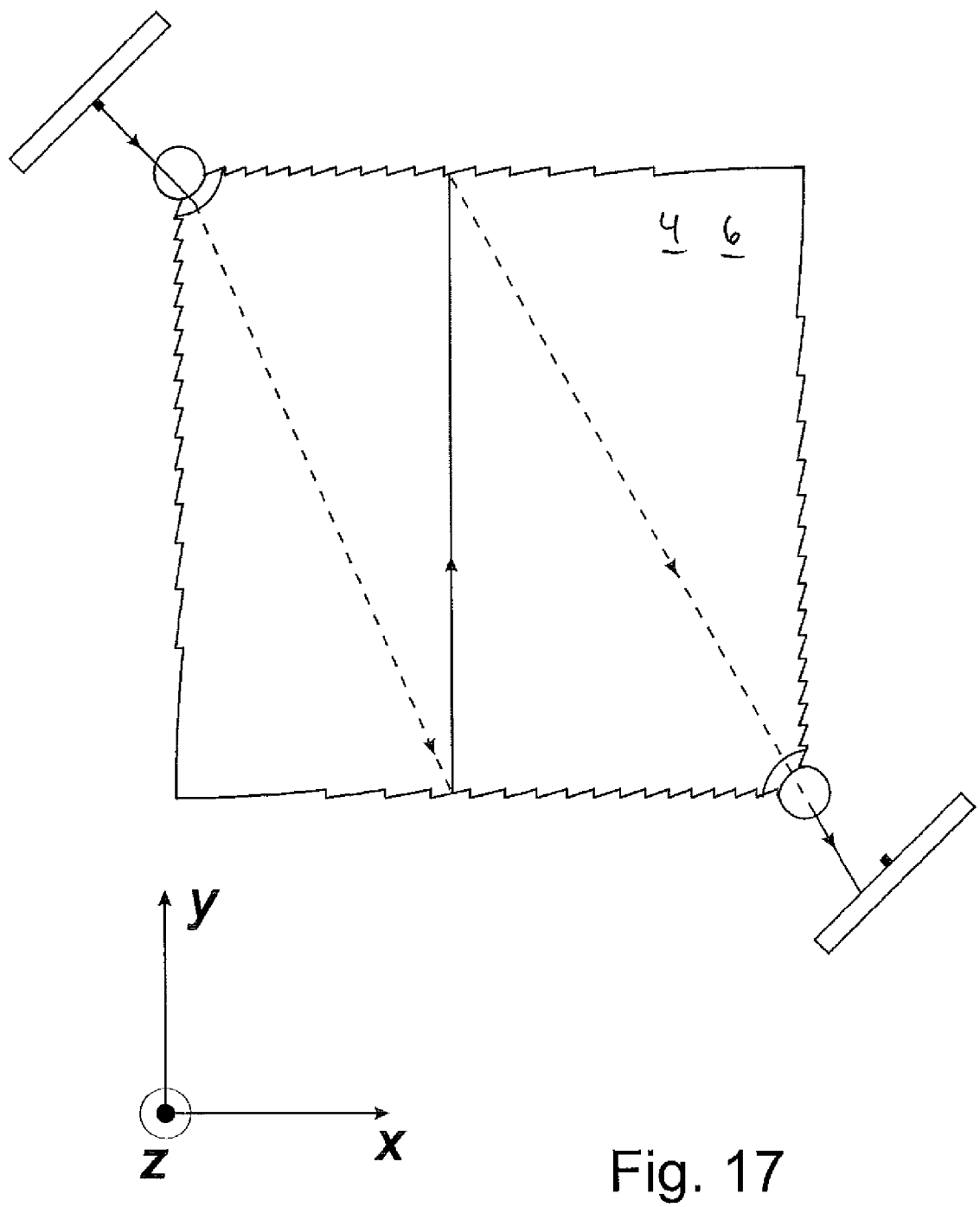

FIGS. 10, 12, 14 and 15 illustrate top views of the second embodiment of the device 102 illustrating different light paths. The illustrated paths in FIGS. 14 and 15 are coexisting. However, light propagating along the paths may be or may not be coexisting.

The first light source 20 is adapted to generate first light 48. The touch-sensitive device 102 is adapted to guide first light 48 towards the first redirecting structure 16. The planar waveguide 4 is adapted for guiding first light 48 along a first primary path 50 towards the first detector device 24, the first primary path 50 comprises at least one active part 52 and at least one passive part 54. The at least one active part 52 of the first primary path 50 comprises a first active part 56 being within the first waveguide layer 6.

The touch-sensitive device 102 is adapted to generate second light 26. The planar waveguide is adapted for guiding second light 26 along a second primary path 30 towards the at least one detector device 22. The second primary path 30 comprises at least one active part 32 and at least one passive part 34. The at least one active part 32 of the second primary path comprises a first active part 36 being within the first waveguide layer 6. The first active part 36 of the second primary path 30 intersects the first active part of the first primary path at a primary zone of intersection 38.

The touch-sensitive device 102 is adapted to generate third light 28. The planar waveguide is adapted for guiding third light 28 along a third primary path 40 towards the at least one detector device 22. The third primary path 40 comprises at least one active part 42 and at least one passive part 44. The at least one active part 42 of the third primary path 40 comprises a first active part 46 being within the first waveguide layer 6. The first active part 46 of the third primary path 40 intersects a first active part of a first primary path and the first active part 36 of the second primary path 30 at the primary zone of intersection 38.

FIGS. 16-19 schematically illustrate top views of a third embodiment of a device 202 of the present invention.

The touch-sensitive device 202 comprises a planar waveguide 4 comprising a first waveguide layer 6, a touch-surface 8 being arranged at the first waveguide layer 6, and at least one edge 10 comprising a first edge 12. The touch-sensitive device 202 comprises at least one redirecting structure 14 comprising a first redirecting structure 16 arranged at the first edge 12 and at least one light source 18 adapted to emit light 19 into the planar waveguide 4. The at least one light source 18 comprises a first light source 20. The touch-sensitive device 202 comprises at least one detector device 22 adapted to detect light from the at least one light source 18. The at least one detector device 22 comprises a first detector device 24 adapted to detect light 19 from the first light source 20.

Figure 18:
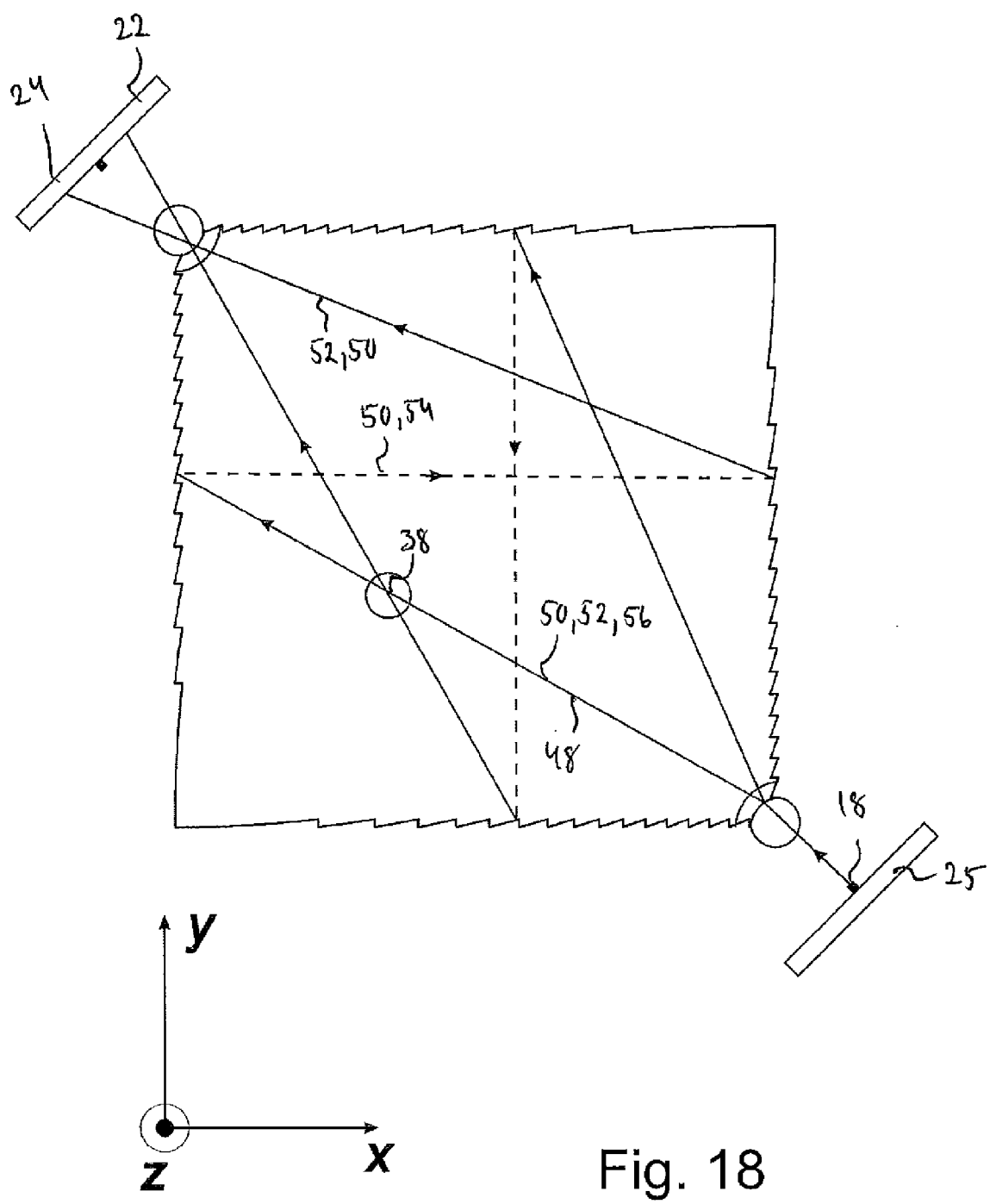
Figure 19:
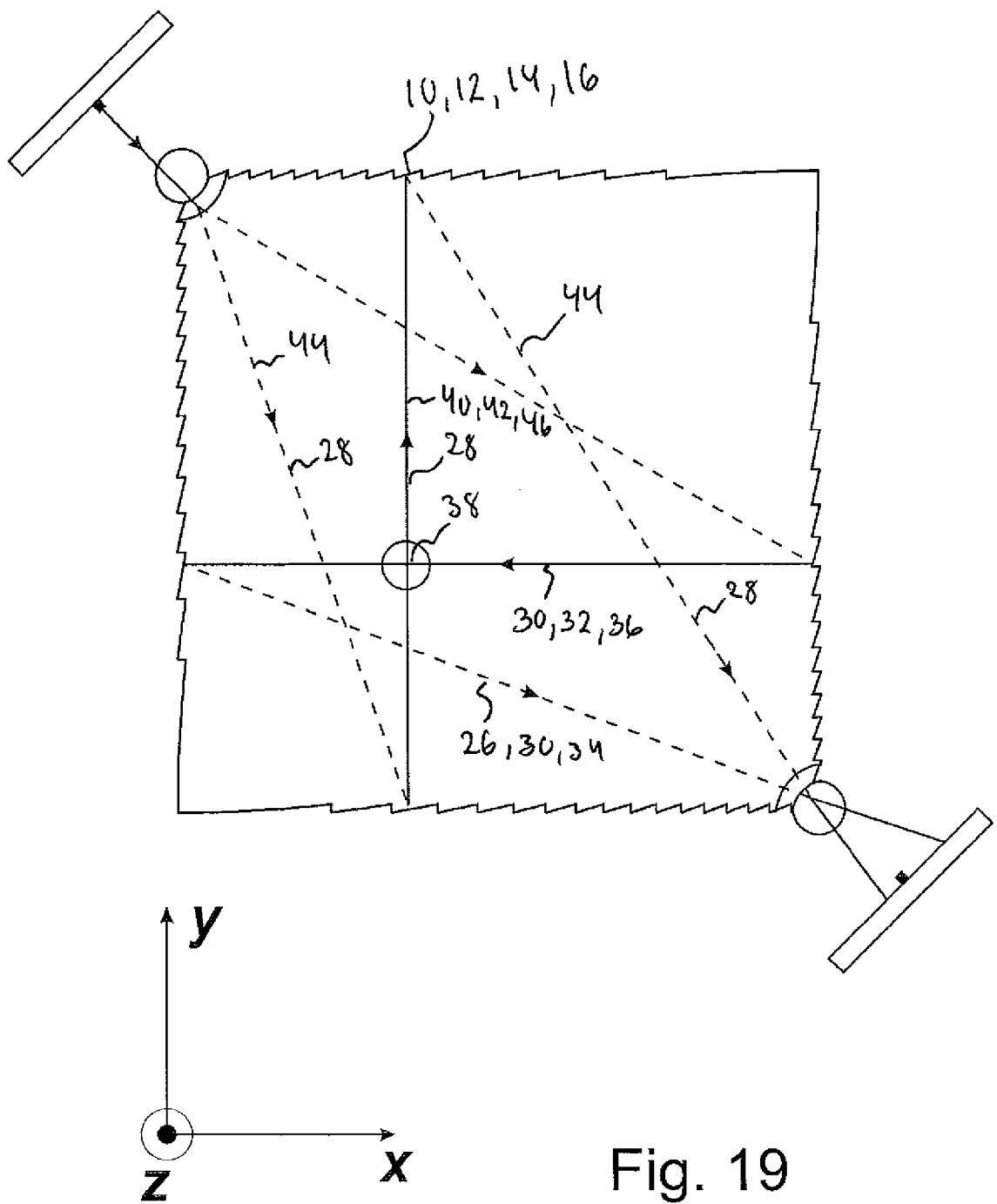
Figure 20:
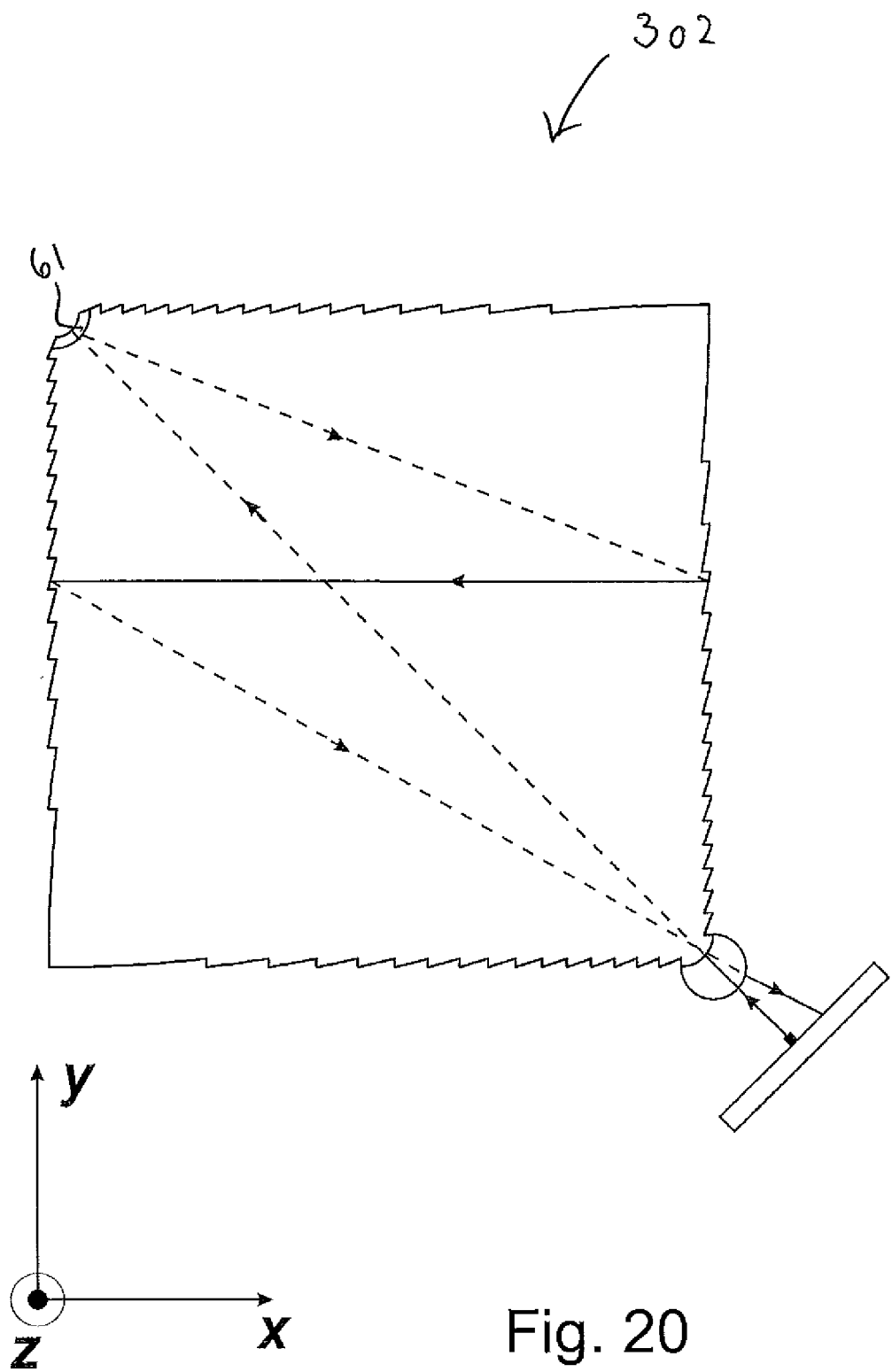
Figure 21:
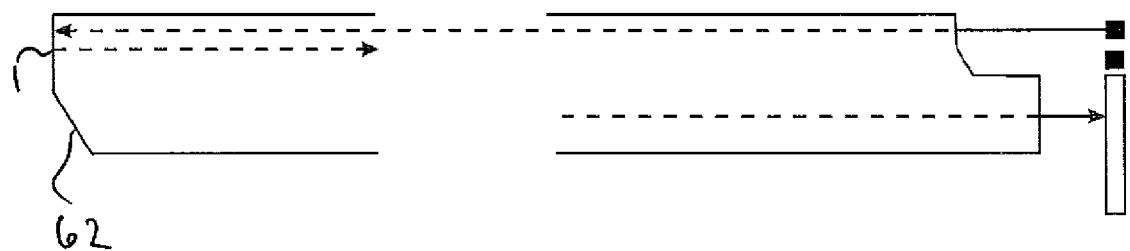
Figure 22:
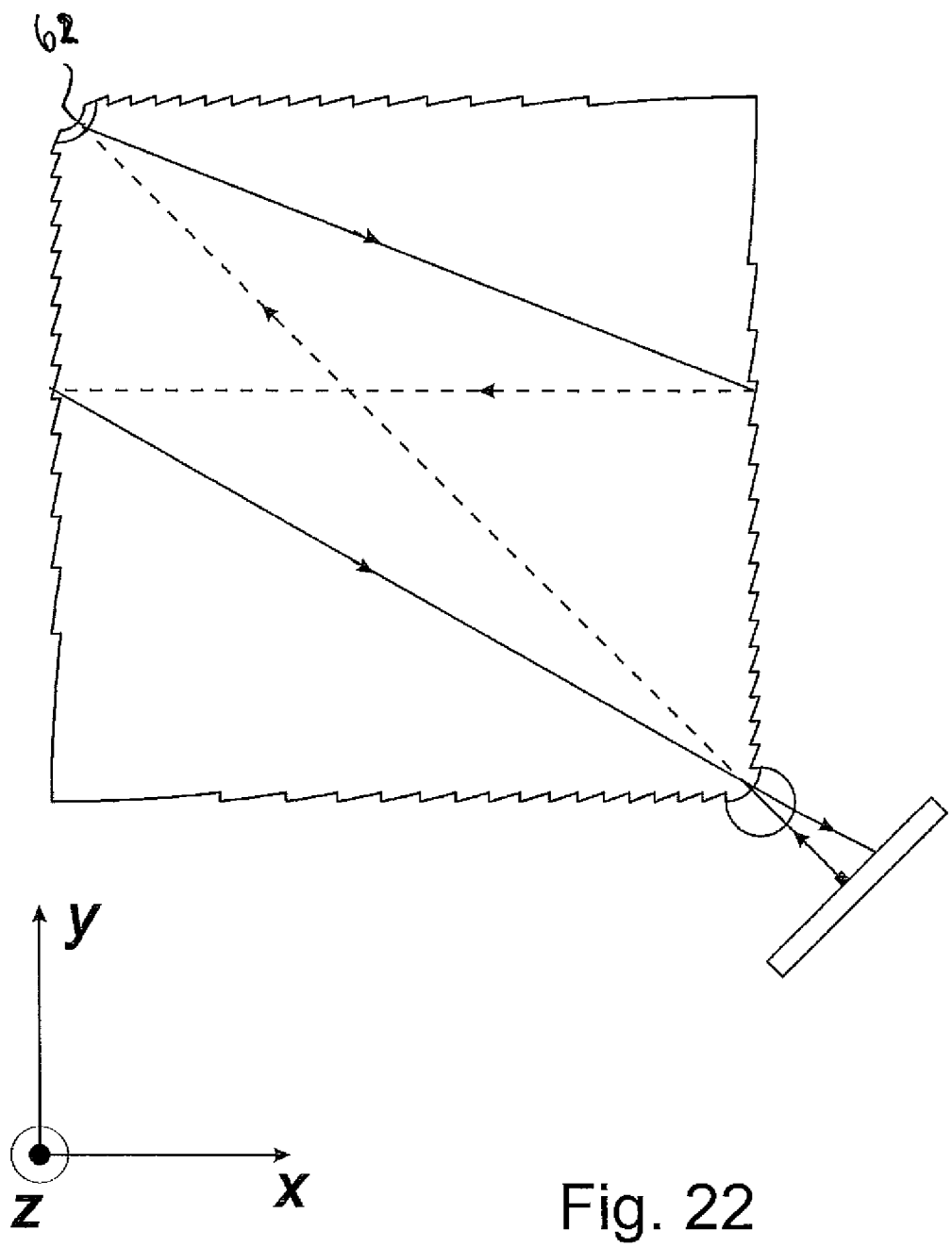
Figure 23:
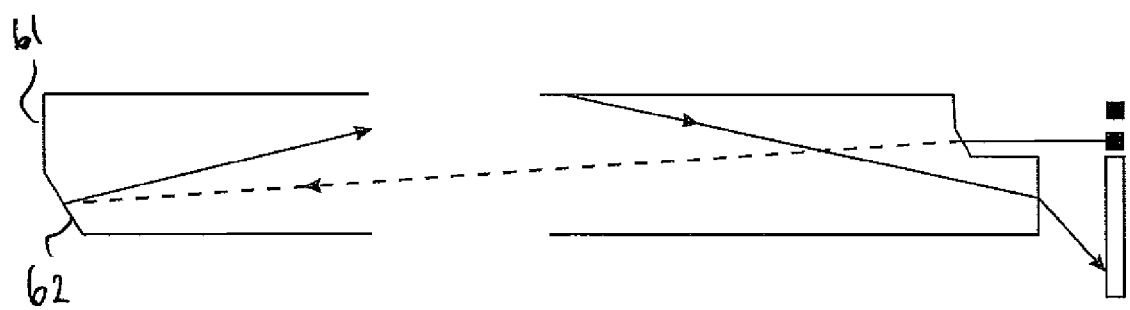

FIGS. 16-19 illustrate top views of the third embodiment of the device 202 illustrating different light paths. The illustrated paths in FIGS. 18 and 19 are coexisting. However, light propagating along the paths may be or may not be coexisting.

The first light source 20 is adapted to generate first light 48. The touch-sensitive device 202 is adapted to guide first light 48 towards the first redirecting structure 16. The planar waveguide 4 is adapted for guiding first light 48 along a first primary path 50 towards the first detector device 24, the first primary path 50 comprises at least one active part 52 and at least one passive part 54. The at least one active part 52 of the first primary path 50 comprises a first active part 56 being within the first waveguide layer 6.

The touch-sensitive device 202 is adapted to generate second light 26. The planar waveguide is adapted for guiding second light 26 along a second primary path 30 towards the at least one detector device 22. The second primary path 30 comprises at least one active part 32 and at least one passive part 34. The at least one active part 32 of the second primary path comprises a first active part 36 being within the first waveguide layer 6. The first active part 36 of the second primary path 30 intersects the first active part of the first primary path at a primary zone of intersection 38.

The touch-sensitive device 202 is adapted to generate third light 28. The planar waveguide is adapted for guiding third light 28 along a third primary path 40 towards the at least one detector device 22. The third primary path 40 comprises at least one active part 42 and at least one passive part 44. The at least one active part 42 of the third primary path 40 comprises a first active part 46 being within the first waveguide layer 6. The first active part 46 of the third primary path 40 intersects a first active part of a first primary path and the first active part 36 of the second primary path 30 at the primary zone of intersection 38.

The at least one detector device 22 comprises a second detector device 25 adapted to detect light from the second light source 21. The second detector device 25 is situated at an opposite part of the planar waveguide 4 in relation to the first detector device 24.

FIGS. 20-25 schematically illustrate top views and cross sectional side views of a fourth embodiment of a device 302 according to the present invention. FIGS. 20, 22, 24 and 25 schematically illustrates a top view of the fourth embodiment of the device 302 according to the present invention.

The touch-sensitive device 302 comprises a planar waveguide 4 comprising a first waveguide layer 6, a touch-surface 8 being arranged at the first waveguide layer 6, and at least one edge 10 comprising a first edge 12. The touch-sensitive device 302 comprises at least one redirecting structure 14 comprising a first redirecting structure 16 arranged at the first edge 12 and at least one light source 18 adapted to emit light 19 into the planar waveguide 4. The at least one light source 18 comprises a first light source 20. The touch-sensitive device 302 comprises at least one detector device 22 adapted to detect light from the at least one light source 18. The at least one detector device 22 comprises a first detector device 24 adapted to detect light 19 from the first light source 20.

Figure 24:
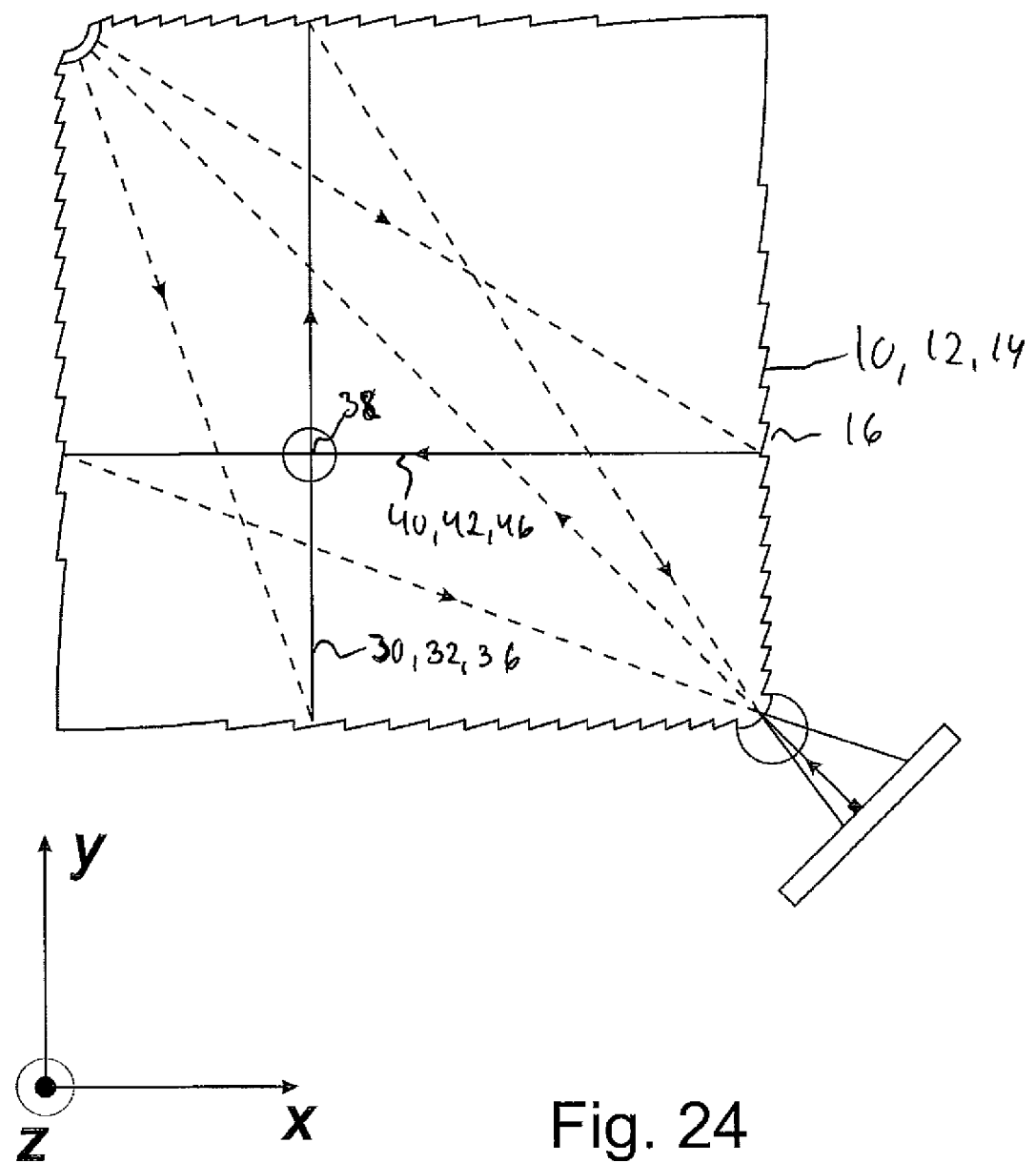
Figure 25:
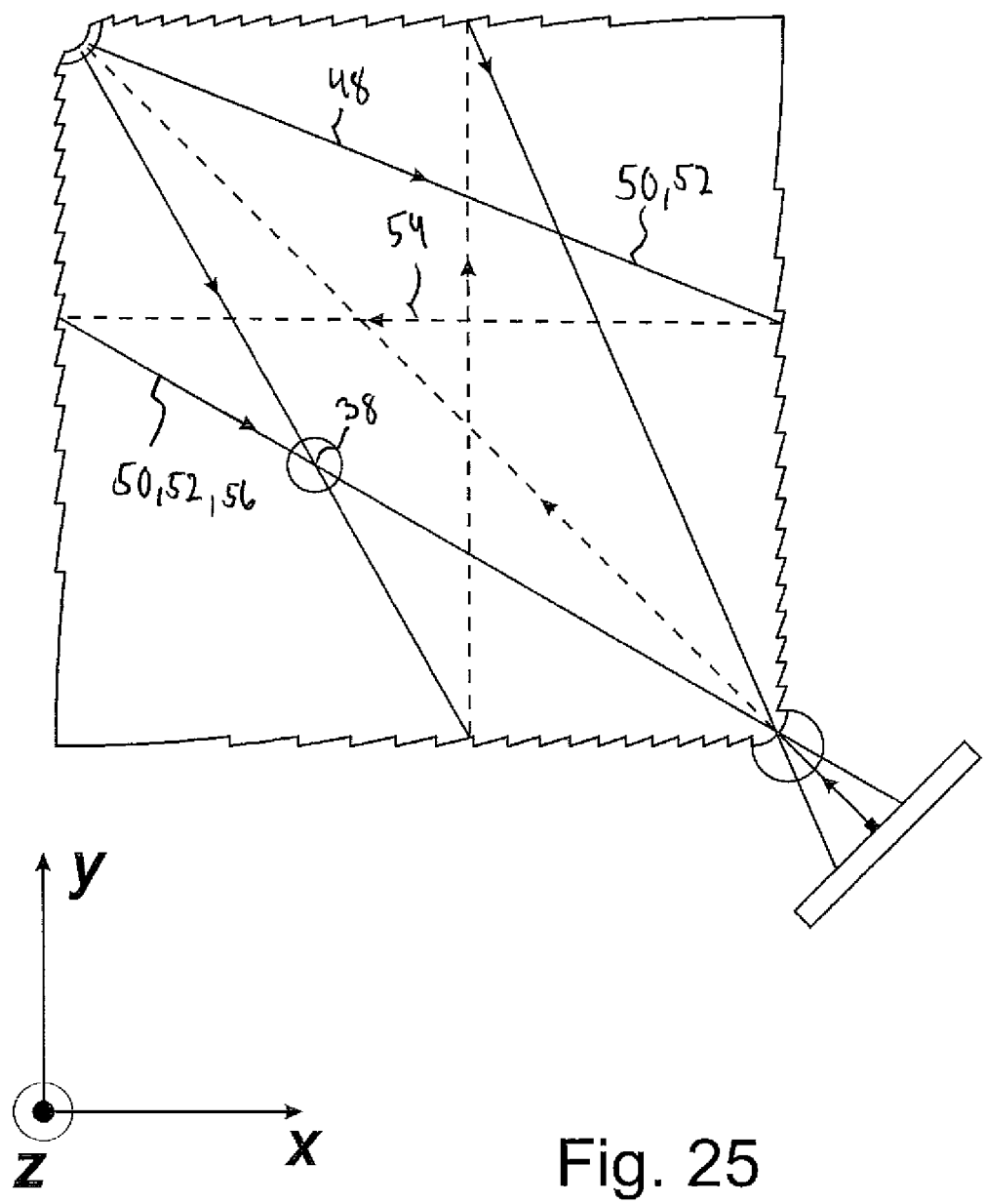

FIGS. 20, 22, 24 and 25 illustrate top views of the fourth embodiment of the device 302 illustrating different light paths. The illustrated paths in FIGS. 24 and 25 are coexisting. However, light propagating along the paths may be or may not be coexisting.

The first light source 20 is adapted to generate first light 48. The touch-sensitive device 302 is adapted to guide first light 48 towards the first redirecting structure 16. The planar waveguide 4 is adapted for guiding first light 48 along a first primary path 50 towards the first detector device 24, the first primary path 50 comprises at least one active part 52 and at least one passive part 54. The at least one active part 52 of the first primary path 50 comprises a first active part 56 being within the first waveguide layer 6.

The touch-sensitive device 302 is adapted to generate second light 26. The planar waveguide is adapted for guiding second light 26 along a second primary path 30 towards the at least one detector device 22. The second primary path 30 comprises at least one active part 32 and at least one passive part 34. The at least one active part 32 of the second primary path comprises a first active part 36 being within the first waveguide layer 6. The first active part 36 of the second primary path 30 intersects the first active part of the first primary path at a primary zone of intersection 38.

The touch-sensitive device 302 is adapted to generate third light 28. The planar waveguide is adapted for guiding third light 28 along a third primary path 40 towards the at least one detector device 22. The third primary path 40 comprises at least one active part 42 and at least one passive part 44. The at least one active part 42 of the third primary path 40 comprises a first active part 46 being within the first waveguide layer 6. The first active part 46 of the third primary path 40 intersects a first active part of a first primary path and the first active part 36 of the second primary path 30 at the primary zone of intersection 38.

The first light source is adapted for emitting light towards the first dispersion structure. The second light source is adapted for emitting light towards the second dispersion structure. In an alternative embodiment, the first light source is adapted for emitting light towards the first dispersion structure and for emitting light towards the second dispersion structure.

The first dispersion structure 62 is adapted for reflection of first light towards the first redirecting structure. The second dispersion 61 structure is adapted to generate or disperse second light and third light by dispersion of light from the second light source towards the first redirecting structure.

Figure 26:
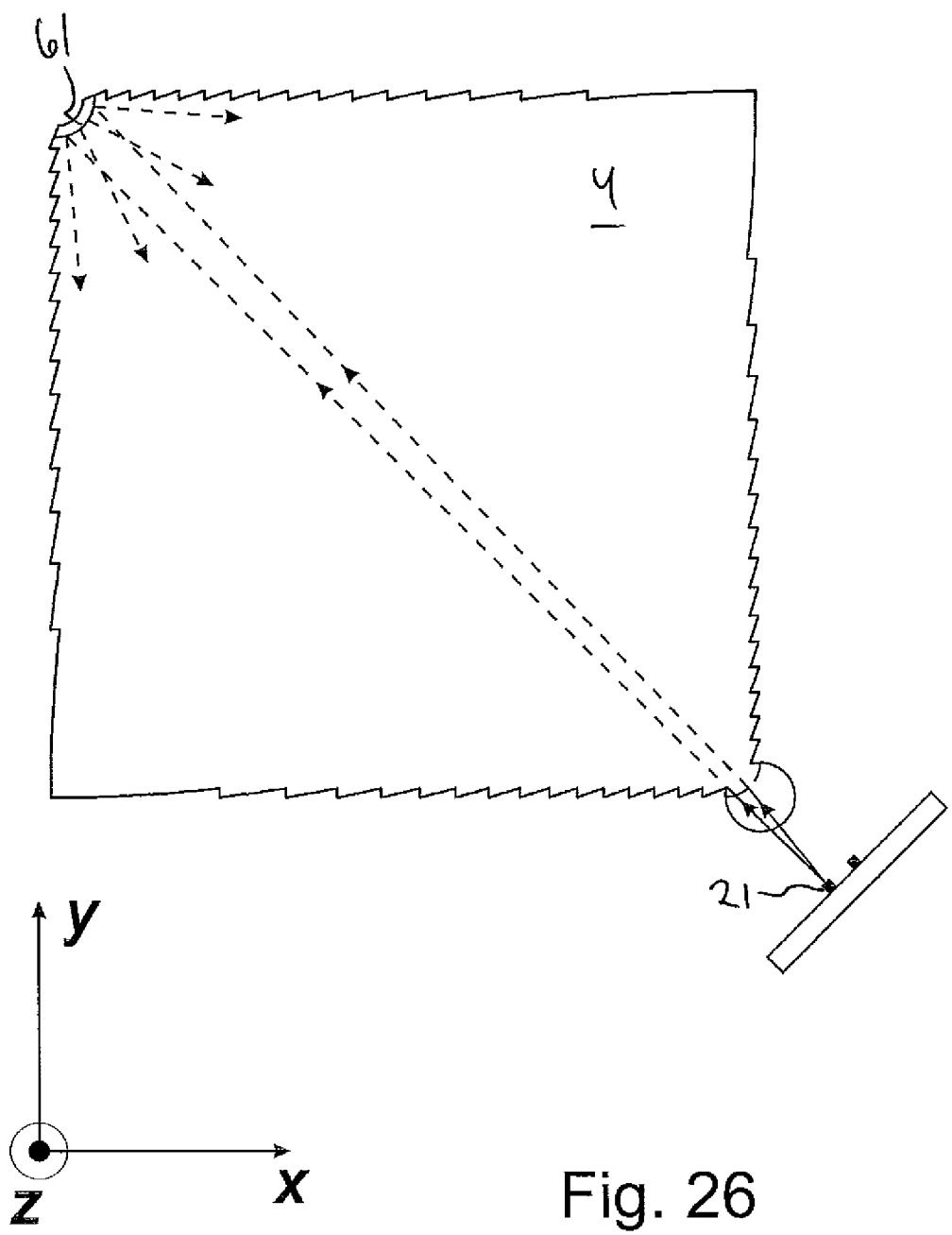
Figure 27:
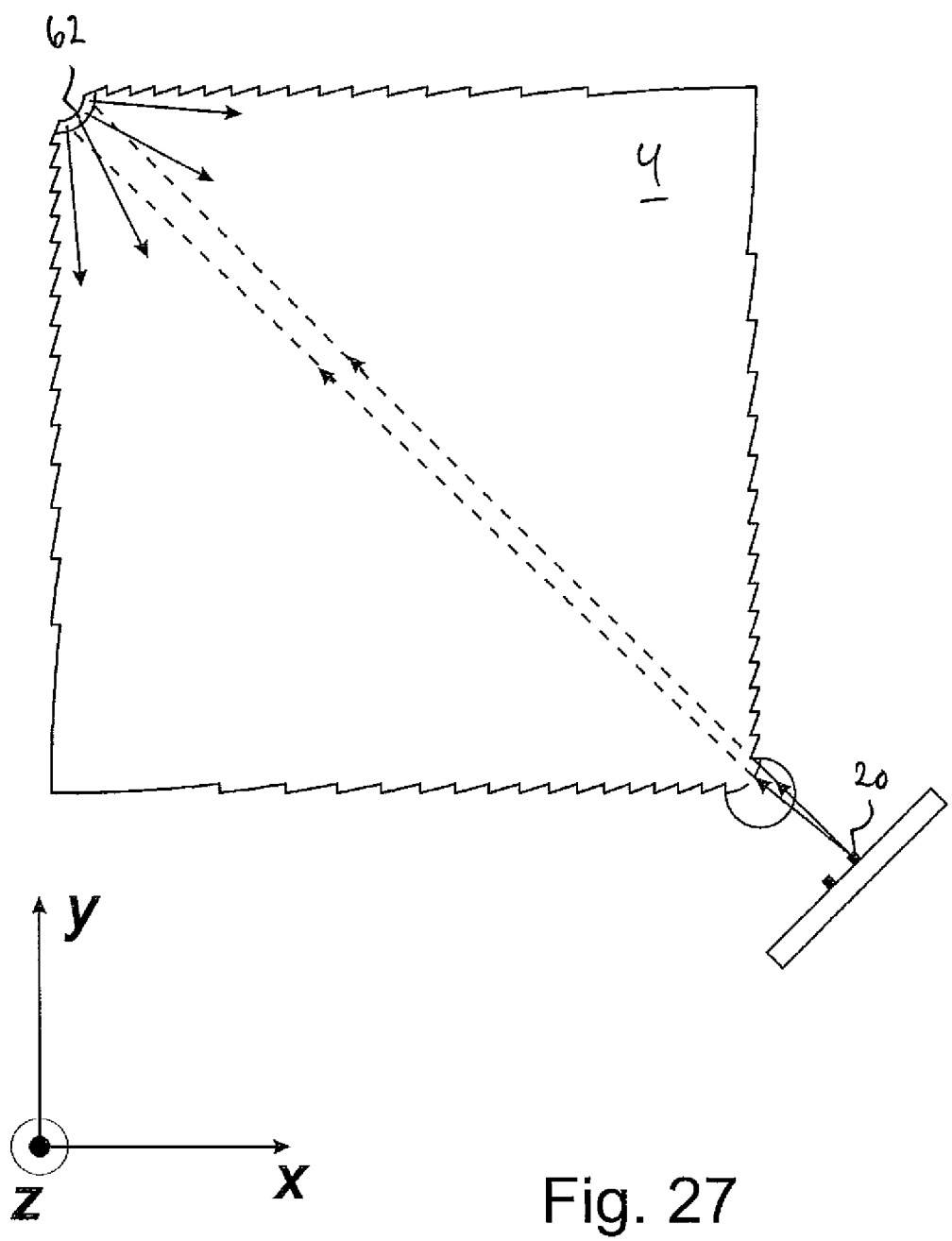

FIGS. 26-27 schematically illustrate an alternative of the fourth embodiment wherein the first light source and the second light source are situated next to each other on a plane parallel with the planar waveguide 4.

Figure 28:
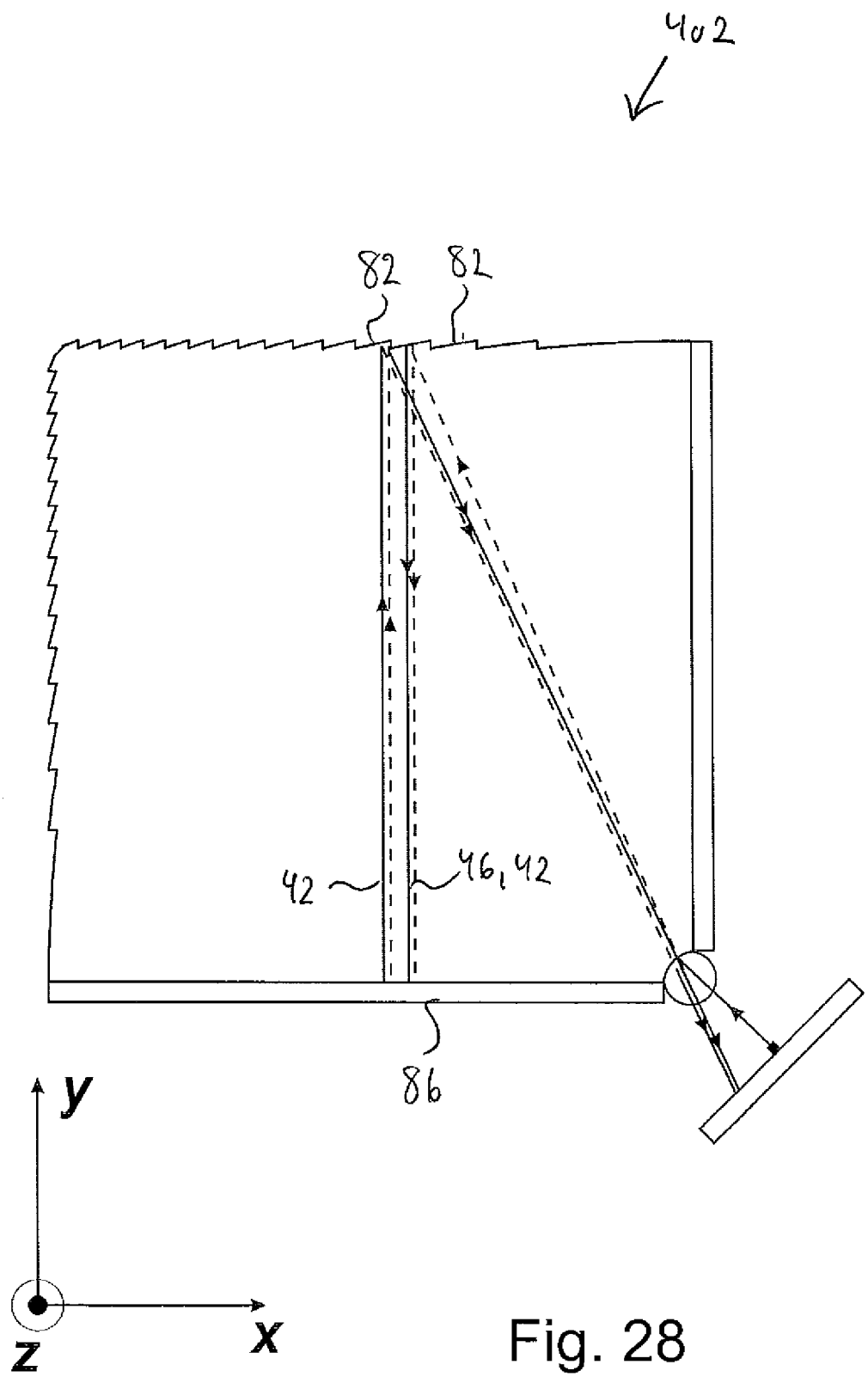
Figure 36:
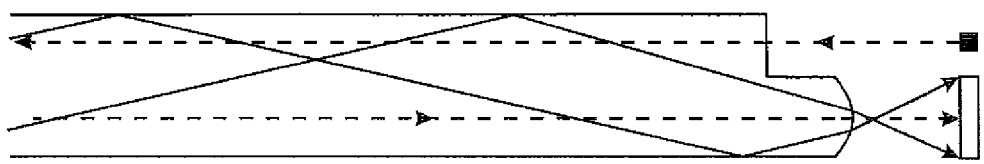
Figure 37:
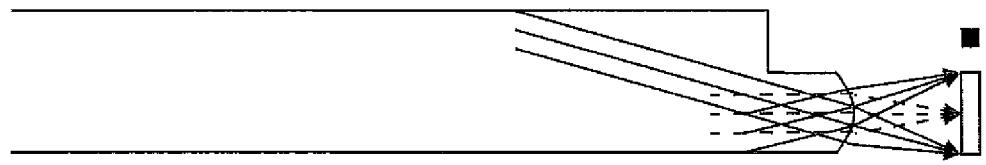

FIGS. 28, 36 and 37 schematically illustrate a top view and cross sectional side views of a fifth embodiment of a device 402 according to the present invention. FIG. 28 schematically illustrates a top view of the fifth embodiment of the device 402 according to the present invention.

In the figures illustrating the fifth embodiment, light rays are shown slightly separated for illustrations purposes.

The touch-sensitive device 402 comprises a planar waveguide 4 comprising a first waveguide layer 6, a touch-surface 8 being arranged at the first waveguide layer 6, and at least one edge 10 comprising a first edge 12. The touch-sensitive device 402 comprises at least one redirecting structure 14 comprising a first redirecting structure 16 arranged at the first edge 12 and at least one light source 18 adapted to emit light 19 into the planar waveguide 4. The at least one light source 18 comprises a first light source 20. The touch-sensitive device 402 comprises at least one detector device 22 adapted to detect light from the at least one light source 18. The at least one detector device 22 comprises a first detector device 24 adapted to detect light 19 from the first light source 20.

FIG. 28 illustrates a top view of the fifth embodiment of the device 402 illustrating different light paths.

The first light source 20 is adapted to generate first light 48. The touch-sensitive device 402 is adapted to guide first light 48 towards the first redirecting structure 16. The planar waveguide 4 is adapted for guiding first light 48 along a first primary path 50 towards the first detector device 24, the first primary path 50 comprises at least one active part 52 and at least one passive part 54. The at least one active part 52 of the first primary path 50 comprises a first active part 56 being within the first waveguide layer 6.

The touch-sensitive device 402 is adapted to generate second light 26. The planar waveguide is adapted for guiding second light 26 along a second primary path 30 towards the at least one detector device 22. The second primary path 30 comprises at least one active part 32 and at least one passive part 34. The at least one active part 32 of the second primary path comprises a first active part 36 being within the first waveguide layer 6. The first active part 36 of the second primary path 30 intersects the first active part of the first primary path at a primary zone of intersection 38.

The touch-sensitive device 402 is adapted to generate third light 28. The planar waveguide is adapted for guiding third light 28 along a third primary path 40 towards the at least one detector device 22. The third primary path 40 comprises at least one active part 42 and at least one passive part 44. The at least one active part 42 of the third primary path 40 comprises a first active part 46 being within the first waveguide layer 6. The first active part 46 of the third primary path 40 intersects a first active part of a first primary path and the first active part 36 of the second primary path 30 at the primary zone of intersection 38.

The first light source is adapted for emitting light towards the first dispersion structure. The first primary redirecting structure comprises at least one reflecting surface 91 being tilted in relation to a normal of the touch-surface, such that the at least one reflecting surface 91 forms an angle relative to the touch-surface within a range of 60°-89°. The first primary redirecting structure furthermore comprises at least one reflecting surface 92 forming approximately a right angle with the touch-surface 8. This is illustrated in more detail in FIGS. 29-31 illustrating the first secondary redirecting structure 82.

Figure 29:
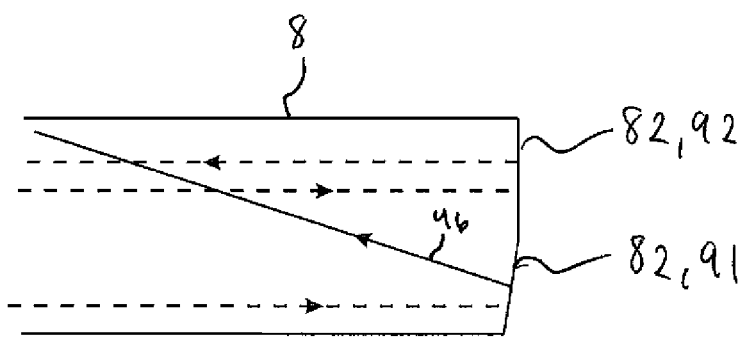

FIG. 29 illustrates light from the first light source arriving to the first secondary redirecting structure 82 at the surfaces 91 and 92, respectively. The arriving light is passive, e.g. approximately parallel to the touch-surface 8. Thus, the first active light part 46 of the first primary path is created.

Figure 30:
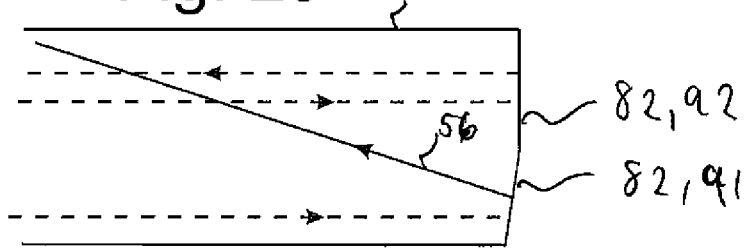

FIG. 30 illustrates reflection of passive light at the first secondary redirecting structure 82, which passive light having arrived from the retroreflecting structure 86. Incident light is reflected by the surfaces 91 and 92, respectively. Reflection from 91 generates the first active part 56 of the first primary path.

Figure 31:
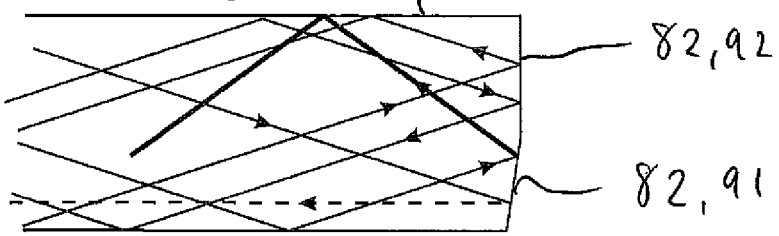

FIG. 31 illustrates reflection of active light at the first secondary redirecting structure 82, which active light 42 having arrived from the retroreflecting structure 86. Incident light is reflected by the surfaces 91 and 92, respectively.

FIG. 32 illustrates in more detail the light reflection from surface 92 as illustrated in FIG. 29. FIG. 33 illustrates in more detail the light reflection from surface 91 as illustrated in FIG. 29. FIG. 34 illustrates in more detail the light reflection from surface 92 as illustrated in FIGS. 30 and 31. FIG. 35 illustrates in more detail the light reflection from surface 91 as illustrated in FIGS. 30 and 31. Angles of 0 and 9 degrees in relation to a normal of the touch-surface are shown as an example for FIGS. 32-35.

Figure 38:
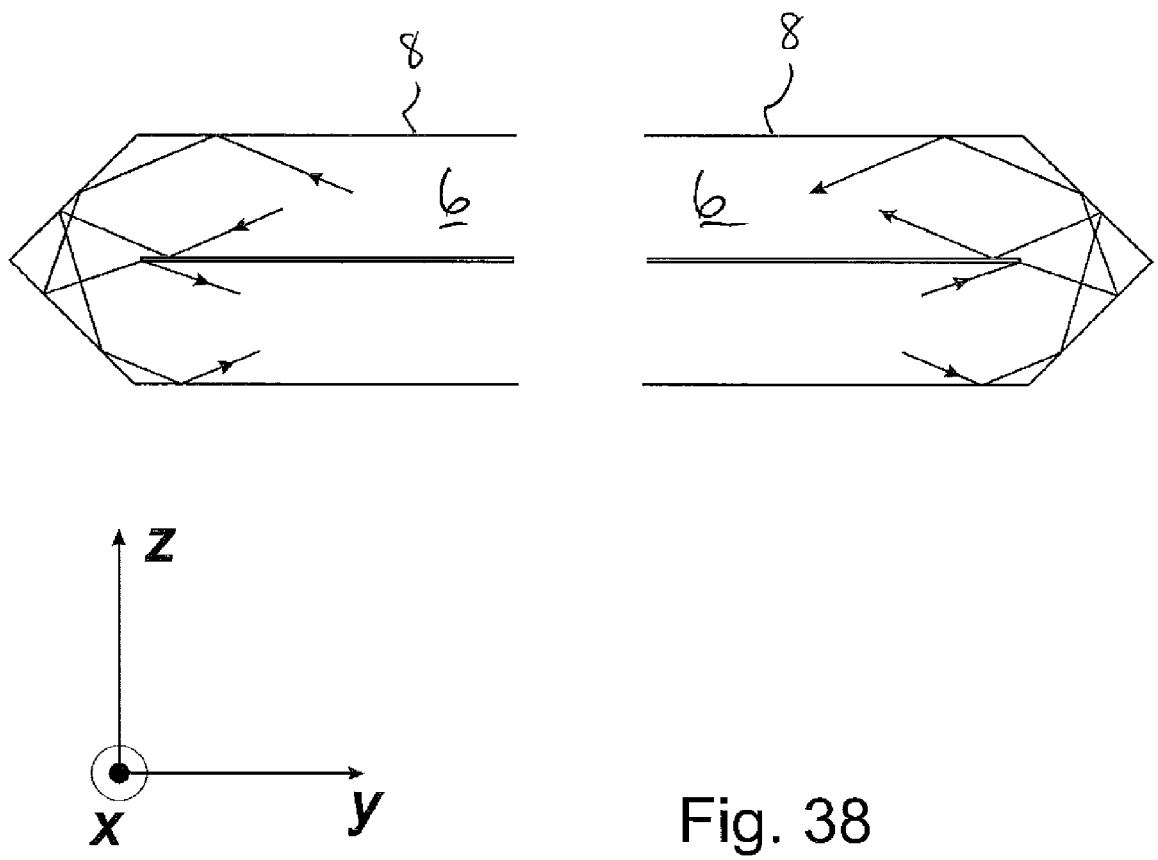

FIG. 38 illustrates cross sectional side views of a planar waveguide having a first waveguide layer 6 and a second waveguide layer. The figure illustrates coupling of light between the layers at the first redirecting structure and at the second redirecting structure, respectively. For at least any of the embodiments according to the present invention comprising a first light source and a second light source, the planar waveguide may comprise a second waveguide layer adapted for guiding first light along at least one part of the at least one passive part of the first primary path, second light along at least one part of the at least one passive part of the second primary path, and third light along at least one part of the at least one passive part of the third primary path.

Figure 39:
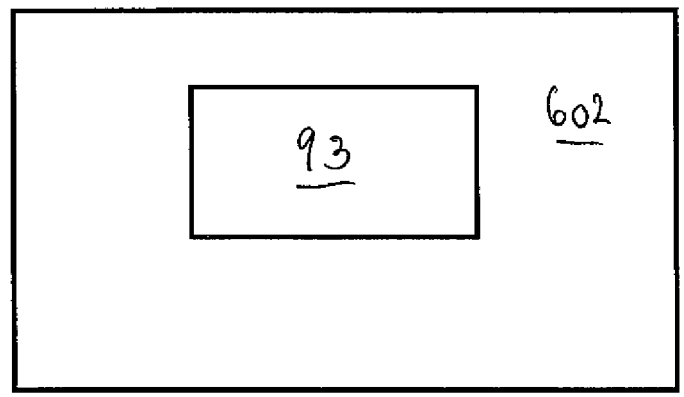

FIG. 39 illustrates a touch-sensitive device 602 according to the present invention comprising a processor 93 adapted for position encoding the primary zone of intersection based on light intensities received by the at least one detector device. The processor 93 may furthermore be adapted for position encoding the secondary zone of intersection based on light intensities received by the at least one detector device such that the positions of two concurrent touches may be deduced.

Figure 40:
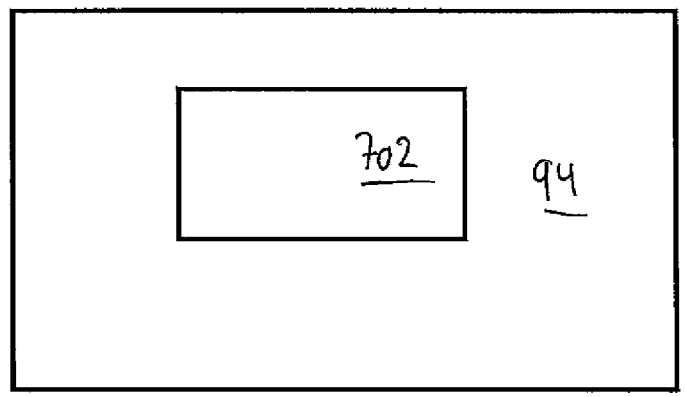

FIG. 40 illustrates a touch-sensitive device 702 according to present invention, wherein the touch-sensitive device is part of a touch screen 94, such as incorporated in an optical table or a handheld device such as a handheld device comprising at least one of a mobile phone, a pda, and a portable music player.

Figure 41:
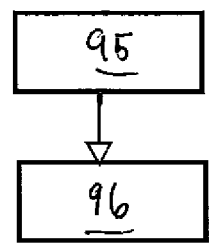

FIG. 41 illustrates a method for detecting at least one position of touch at a touch-surface on a touch-sensitive device according to the present invention. The method comprises emitting 95 light into the planar waveguide and detecting 96 light arriving at the at least one detector device.

Sequence Listing

Not Applicable

The invention claimed is:

1. A touch-sensitive device comprising:
a planar waveguide comprising a first waveguide layer, a touch-surface being arranged at the first waveguide layer, and at least one edge comprising a first edge,
at least one redirecting structure comprising a first redirecting structure arranged at the first edge,
at least one light source adapted to emit light into the planar waveguide, the at least one light source comprising a first light source, and
at least one detector device adapted to detect light from the at least one light source, the at least one detector device comprising a first detector device adapted to detect light from the first light source,
the first light source being adapted to generate first light, the touch-sensitive device being adapted to guide first light towards the first redirecting structure, the planar waveguide being adapted for guiding first light along a first primary path towards the first detector device, the first primary path comprising at least one active part and at least one passive part, the at least one active part of the first primary path comprising a first active part being within the first waveguide layer,
the touch-sensitive device being adapted to generate second light, the planar waveguide being adapted for guiding second light along a second primary path towards the at least one detector device, the second primary path comprising at least one active part and at least one passive part, the at least one active part of the second primary path comprising a first active part being within the first waveguide layer, the first active part of the second primary path intersecting the first active part of the first primary path at a primary zone of intersection,
the touch-sensitive device being adapted to generate third light, the planar waveguide being adapted for guiding third light along a third primary path towards the at least one detector device, the third primary path comprising at least one active part and at least one passive part, the at least one active part of the third primary path comprising a first active part being within the first waveguide layer, the first active part of the third primary path intersecting the first active part of the first primary path and the first active part of the second primary path at the primary zone of intersection.

2. A touch-sensitive device according to claim 1, wherein the planar waveguide being adapted for guiding first light along a first secondary path towards the first detector device, the first secondary path comprising at least one active part and at least one passive part, the at least one active part of the first secondary path comprising a first active part being within the first waveguide layer, the planar waveguide being adapted for guiding second light along a second secondary path towards the at least one detector device, the second secondary path comprising at least one active part and at least one passive part, the at least one active part of the second secondary path comprising a first active part being within the first waveguide layer, the first active part of the second secondary path intersecting the first active part of the first secondary path at a secondary zone of intersection, the planar waveguide being adapted for guiding third light along a third secondary path towards the at least one detector device, the third secondary path comprising at least one active part and at least one passive part, the at least one active part of the third secondary path comprising a first active part being within the first waveguide layer, the first active part of the third secondary path intersecting the first active part of the first secondary path and the first active part of the second secondary path at the secondary zone of intersection.

3. A touch-sensitive device according to claim 2, wherein the first active part of the first primary path is converging or diverging in relation to the first active part of the first secondary path.

4. A touch-sensitive device according to claim 2, wherein the first active part of the second primary path is substantially parallel to the first active part of the second secondary path.

5. A touch-sensitive device according to claim 2, wherein the first active part of the third primary path is substantially parallel to the first active part of the third secondary path.

6. A touch-sensitive device according to claim 1, wherein the at least one light source comprises a second light source adapted to generate the second light.

7. A touch-sensitive device according to claim 6, wherein the second light source is adapted to generate the third light.

8. A touch-sensitive device according to claim 6, wherein the first light source and the second light source are adapted to emit light into the planar waveguide sequentially.

9. A touch-sensitive device according to claim 6, wherein the first light source is adapted to emit light within a first range of wavelengths into the planar waveguide, and wherein the second light source is adapted to emit light within a second range of wavelengths into the planar waveguide.

10. A touch-sensitive device according to claim 1 wherein the touch-sensitive device is adapted to disperse first light towards the first redirecting structure.

11. A touch-sensitive device according to claim 10, comprising at least one dispersion structure comprises a first dispersion structure adapted to disperse first light towards the first redirecting structure.

12. A touch-sensitive device according to claim 11, wherein the at least one dispersion structure comprises a second dispersion structure adapted to disperse second light towards the at least one redirecting structure and adapted to disperse third light towards the at least one redirecting structure.

13. A touch-sensitive device according to claim 12, wherein the second dispersion structure is adapted to generate or disperse second light and third light by dispersion of light from the first light source.

14. A touch-sensitive device according to claim 1 wherein the planar waveguide comprises at least one transmission surface at the at least one edge of the planar waveguide for transmitting light towards the at least one detector device, the at least one transmission surface comprising a first transmission surface for transmitting light towards the first detector device.

15. A touch-sensitive device according to claim 14, wherein the first transmission surface comprises a surface of the planar waveguide having a convex shape in a plane parallel to the planar waveguide.

16. A touch-sensitive device according to claim 1 adapted such that first light, when propagating along the first active part of the first primary path, is within an active angle range in relation to the touch-surface, and adapted such that first light, when propagating along the at least one passive part of the first primary path, is within a passive angle range in relation to the touch-surface.

17. A touch-sensitive device according to claim 1 wherein the first edge comprising a first primary edge and a first secondary edge, the at least one edge comprising a second edge comprising a second primary edge and a second secondary edge, the at least one redirecting structure comprising a second redirecting structure, the first redirecting structure comprising a first primary redirecting structure arranged at the first primary edge and a first secondary redirecting structure arranged at the first secondary edge, the second redirecting structure comprising a second primary redirecting structure arranged at the second primary edge and a second secondary redirecting structure arranged at the second secondary edge, the first redirecting structure being adapted to redirect first primary light towards the second redirecting structure.

18. A touch-sensitive device according to claim 17, wherein the second primary redirecting structure comprises a retroreflecting structure, and wherein the second secondary redirecting structure comprises a retroreflecting structure.

19. A touch-sensitive device according to claim 17, wherein the first primary redirecting structure comprises at least one reflecting surface being tilted in relation to a normal of the touch-surface, such that the at least one reflecting surface forms an angle relative to the touch-surface within a range of 60°-89°, such as an angle within a range of 70°-86°, such as an angle within a range of 76°-82°.

20. A touch-sensitive device according to claim 18, wherein the first primary redirecting structure comprises at least one reflecting surface being tilted in relation to a normal of the touch-surface, such that the at least one reflecting surface forms an angle relative to the touch-surface within a range of 60°-89°, such as an angle within a range of 70°-86°, such as an angle within a range of 76°-82°.

21. A method for detecting at least one position of touch at a touch-surface on a touch-sensitive device according to any of claims 1-8, 9, 10-11, 12-13, 14-15, 16, 17, 18, 19, or 20, the method comprising:

generating first light by means of the first light source,
emitting light from the at least one light source into the planar waveguide,
generating second light and generating third light,
guiding first light towards the first redirecting structure,
guiding, by means of the planar waveguide, first light along a first primary path towards the first detector device, the first primary path comprising at least one active part and at least one passive part, the at least one active part of the first primary path comprising a first active part being within the first planar waveguide layer of the planar waveguide,
guiding, by means of the planar waveguide, second light along a second primary path towards the at least one detector device, the second primary path comprising at least one active part and at least one passive part, the at least one active part of the second primary path comprising a first active part being within the first waveguide layer, the first active part of the second primary path intersecting the first active part of the first primary path at a primary zone of intersection,
guiding, by means of the planar waveguide, third light along a third primary path towards the at least one detector device, the third primary path comprising at least one active part and at least one passive part, the at least one active part of the third primary path comprising a first active part being within the first waveguide layer, the first active part of the third primary path intersecting the first active part of the first primary path and the first active part of the second primary path at the primary zone of intersection, and
detecting, by means of the at least one detector device, light intensities from the at least one light source.

* * * * *